US011452355B2

(12) United States Patent
Macedo et al.

(10) Patent No.: US 11,452,355 B2
(45) Date of Patent: Sep. 27, 2022

(54) DYE DISPENSING SYSTEM

(71) Applicant: CLiCS, LLC, La Jolla, CA (US)

(72) Inventors: Leilani M. Macedo, Carlsbad, CA (US); Charles D. Brown, Carlsbad, CA (US); Jeffrey F. Macedo, Sparks, NV (US); Stuart D'Alessandro, Sparks, NV (US); Christopher Munz, Reno, NV (US); Jeffrey S. Ploetner, La Jolla, CA (US)

(73) Assignee: CLiCS, LLC, San Diego, CA (US)

( * ) Notice: Subject to any disclaimer, the term of this patent is extended or adjusted under 35 U.S.C. 154(b) by 0 days.

(21) Appl. No.: 16/277,425

(22) Filed: Feb. 15, 2019

(65) Prior Publication Data

US 2019/0320777 A1 Oct. 24, 2019

Related U.S. Application Data

(63) Continuation of application No. 15/956,490, filed on Apr. 18, 2018, now Pat. No. 10,206,478.

(51) Int. Cl.
*G05B 15/02* (2006.01)
*A45D 34/00* (2006.01)
*A45D 44/00* (2006.01)

(52) U.S. Cl.
CPC .......... *A45D 34/00* (2013.01); *A45D 44/005* (2013.01); *G05B 15/02* (2013.01); *A45D 2034/005* (2013.01); *A45D 2200/058* (2013.01)

(58) Field of Classification Search
None
See application file for complete search history.

(56) References Cited

U.S. PATENT DOCUMENTS 4,152,113 A * 5/1979 Walker ................. D06B 23/20
8/440
4,365,853 A * 12/1982 Ehrlich .................... A47K 5/08
312/42

(Continued)

FOREIGN PATENT DOCUMENTS

CN 102556374 A 7/2012
DE 4113454 A1 12/1991

(Continued)

OTHER PUBLICATIONS

Abraham, A Beginner's Guide to (CIE) Colorimetry, Medium, Sep. 10, 2016, Accessed Online: https://medium.com/hipster-color-science/a-beginners-guide-to-colorimetry-401f1830b65a.

(Continued)

*Primary Examiner* — Jason Lin
(74) *Attorney, Agent, or Firm* — Knobbe, Martens, Olson & Bear, LLP

(57) ABSTRACT

A system is disclosed including at least one scanner identifying an identification associated with a receptacle. At least one dispenser is configured to dispense a first desired amount. At least one dispensing area has a measuring instrument that measures a dispensed amount and an unused amount, and associates with the identification. At least one storage device stores a program, and at least one controller which, when executing the program, is configured to receive information and associate the information with the identification. Collected data associated with the identification is recorded. A second desired amount based on at least some of the collected data in at least one file in the database is recommended. The at least one dispenser is controlled by the at least one controller based on the first desired amount or the second desired amount. The at least one dispenser is configured to dispense the second desired amount.

19 Claims, 27 Drawing Sheets

(56) References Cited

U.S. PATENT DOCUMENTS

| | | | |
|---|---|---|---|
| 5,078,302 A | | 1/1992 | Hellenberg |
| 5,094,153 A | * | 3/1992 | Helbling .................. A47J 31/52 99/280 |
| 5,163,484 A | * | 11/1992 | Howlett ................ B01F 33/848 235/462.14 |
| 6,056,790 A | * | 5/2000 | Clark ..................... D06B 23/20 8/400 |
| 6,067,504 A | | 5/2000 | MacFarlane et al. |
| 6,089,408 A | | 7/2000 | Fox |
| 6,707,929 B2 | | 3/2004 | Marapane et al. |
| 7,185,789 B2 | | 3/2007 | Mink et al. |
| 7,591,861 B2 | | 9/2009 | Bolton et al. |
| 8,636,173 B2 | | 1/2014 | Bartholomew et al. |
| 8,897,915 B2 | * | 11/2014 | Saranow ................. G06Q 10/10 700/233 |
| 8,977,389 B2 | * | 3/2015 | Witchell ............... A45D 44/005 700/233 |
| 9,372,157 B1 | * | 6/2016 | Todd ..................... G01N 21/314 |
| 10,206,478 B1 | | 2/2019 | Macedo et al. |
| 10,232,330 B2 | | 3/2019 | Macedo et al. |
| 10,695,731 B2 | | 6/2020 | Macedo et al. |
| 2005/0256733 A1 | * | 11/2005 | Nagai .................... G06Q 30/02 705/1.1 |
| 2009/0218007 A1 | * | 9/2009 | Saranow ............... A45D 44/005 141/104 |
| 2009/0321470 A1 | | 12/2009 | Knoth |
| 2011/0015463 A1 | * | 1/2011 | Legendre ................ A45D 40/00 604/289 |
| 2012/0018034 A1 | | 1/2012 | Bertoli et al. |
| 2012/0048880 A1 | | 3/2012 | Damolaris |
| 2013/0123973 A1 | * | 5/2013 | Saranow ............. G06Q 30/0621 700/233 |
| 2014/0082854 A1 | | 3/2014 | Landa et al. |
| 2014/0118521 A1 | * | 5/2014 | Conti .................... G01J 3/0264 348/E7.085 |
| 2014/0174595 A1 | * | 6/2014 | Milhorn ............... B01F 13/1055 141/9 |
| 2015/0089751 A1 | | 4/2015 | Landa et al. |
| 2016/0011051 A1 | | 1/2016 | Conti et al. |
| 2016/0107133 A1 | * | 4/2016 | Sugino ................. B01F 13/1063 366/142 |
| 2017/0189870 A1 | * | 7/2017 | Saranow ............. B01F 13/1069 |
| 2018/0008946 A1 | | 1/2018 | Macedo et al. |
| 2018/0080865 A1 | | 3/2018 | Godfrey et al. |
| 2018/0125206 A1 | | 5/2018 | Shami |
| 2018/0125207 A1 | * | 5/2018 | Shami ................. B01F 13/1063 |
| 2018/0296995 A1 | * | 10/2018 | Kinnen ................. G06Q 20/18 |
| 2019/0105669 A1 | * | 4/2019 | Mikse ................. B05B 13/0457 |

FOREIGN PATENT DOCUMENTS

| | | |
|---|---|---|
| EP | 1507741 A1 | 2/2005 |
| EP | 2775882 A1 | 9/2014 |
| EP | 2789721 A1 | 10/2014 |
| EP | 2858043 A1 | 4/2015 |
| JP | H04-231006 | 8/1992 |
| JP | 2003-072895 | 3/2003 |
| JP | 2005-503856 | 2/2005 |

OTHER PUBLICATIONS

Brown et al, J. Soc. Cosmet. Chem., 36, pp. 31-37, Jan./Feb. 1985.

Kubelka and Munk, An Article on Optics of Paint Layers, Aug. 1931, 16 pages.

Park and Stearns, Spectrophotometric Formulation, Journal of the Optical Society of America, vol. 34, No. 2, Feb. 1944, 112-113.

Yang et al., On the Kubelka Munk Single-Constant/Two-Constant Theories, Textile Research Journal, Nov. 20, 2009, 10 pages, Online Access: http://trj.sagepub.com/cgi/content/abstract/80/3/263.

MIA by Sure Tint, App for Hair Stylists—Must Have Hair Salon App, http://www.suretint.com/, Accessed on Apr. 18, 2018.

International Search Report and Written Opinion dated Oct. 16, 2017 for PCT Patent Application No. PCT/US/2017041050 in 3 pages.

International Search Report and Written Opinion dated Jul. 16, 2019 for PCT Patent Application No. PCT/US2019/027989 in 10 pages.

International Preliminary Report on Patentability dated Jan. 8, 2019 for PCT Patent Application No. PCT/US/2017041050 in 7 pages.

\* cited by examiner

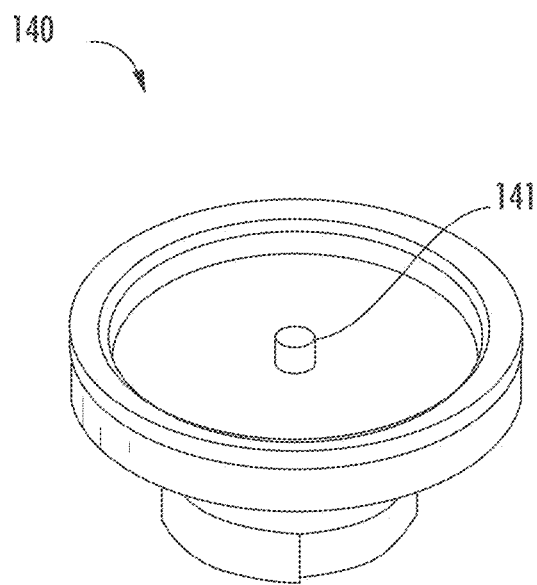
FIG. 6A
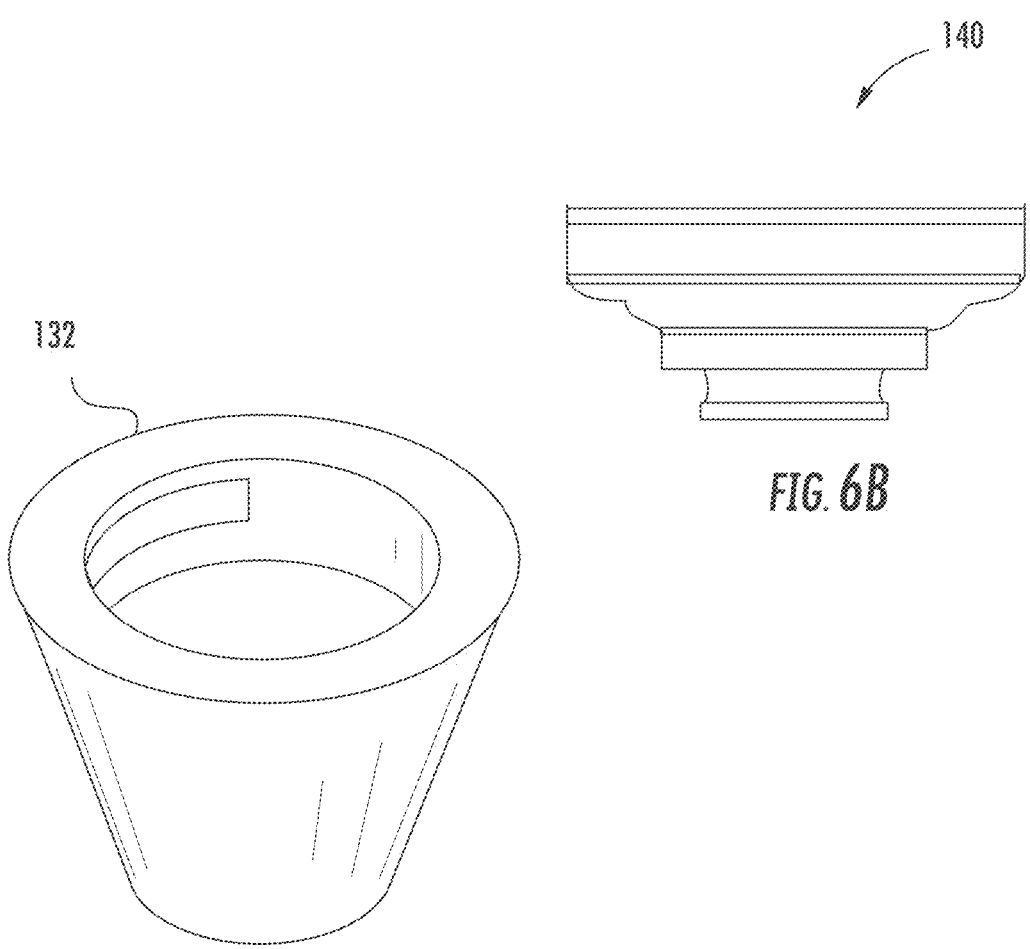
FIG. 6B
FIG. 6C

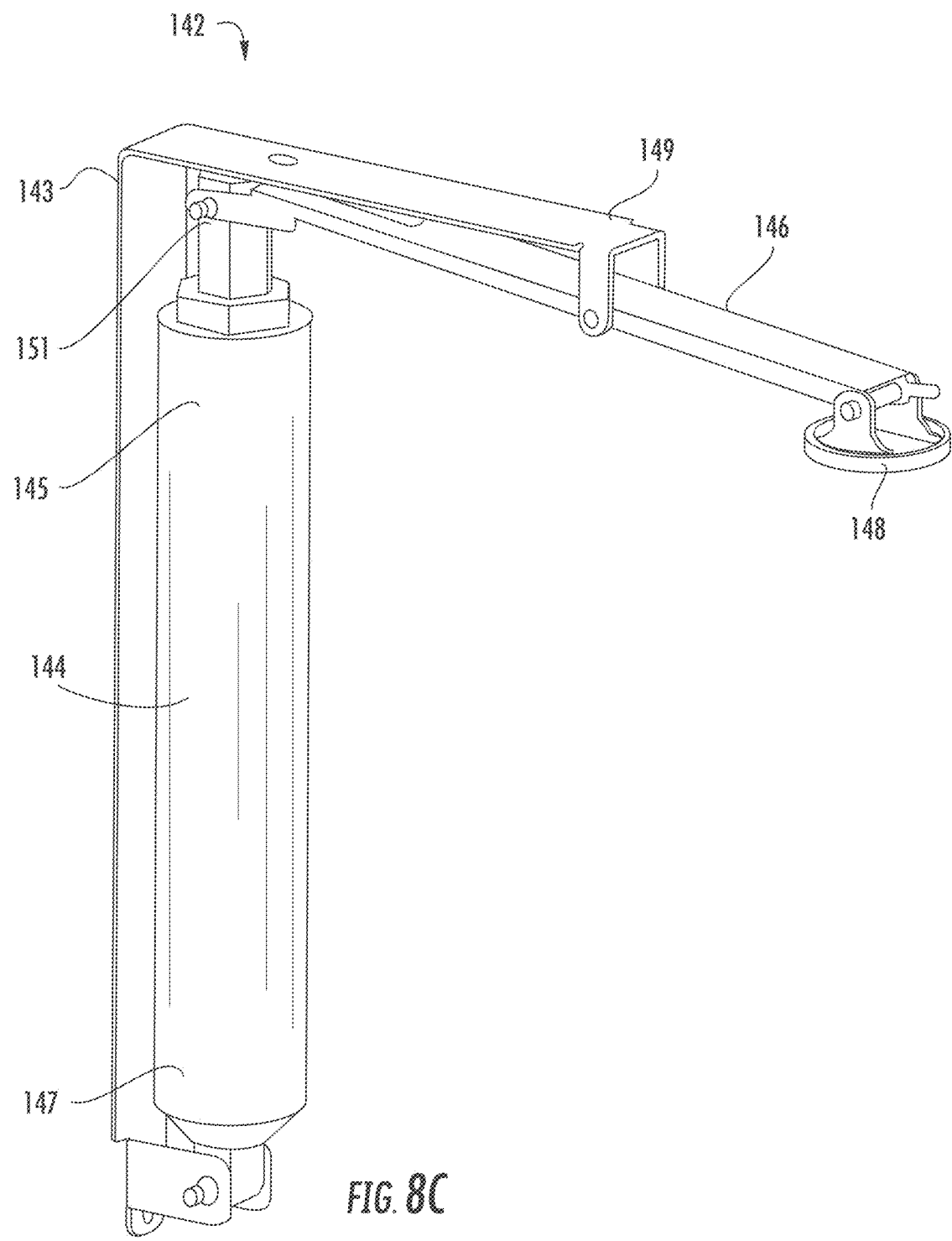

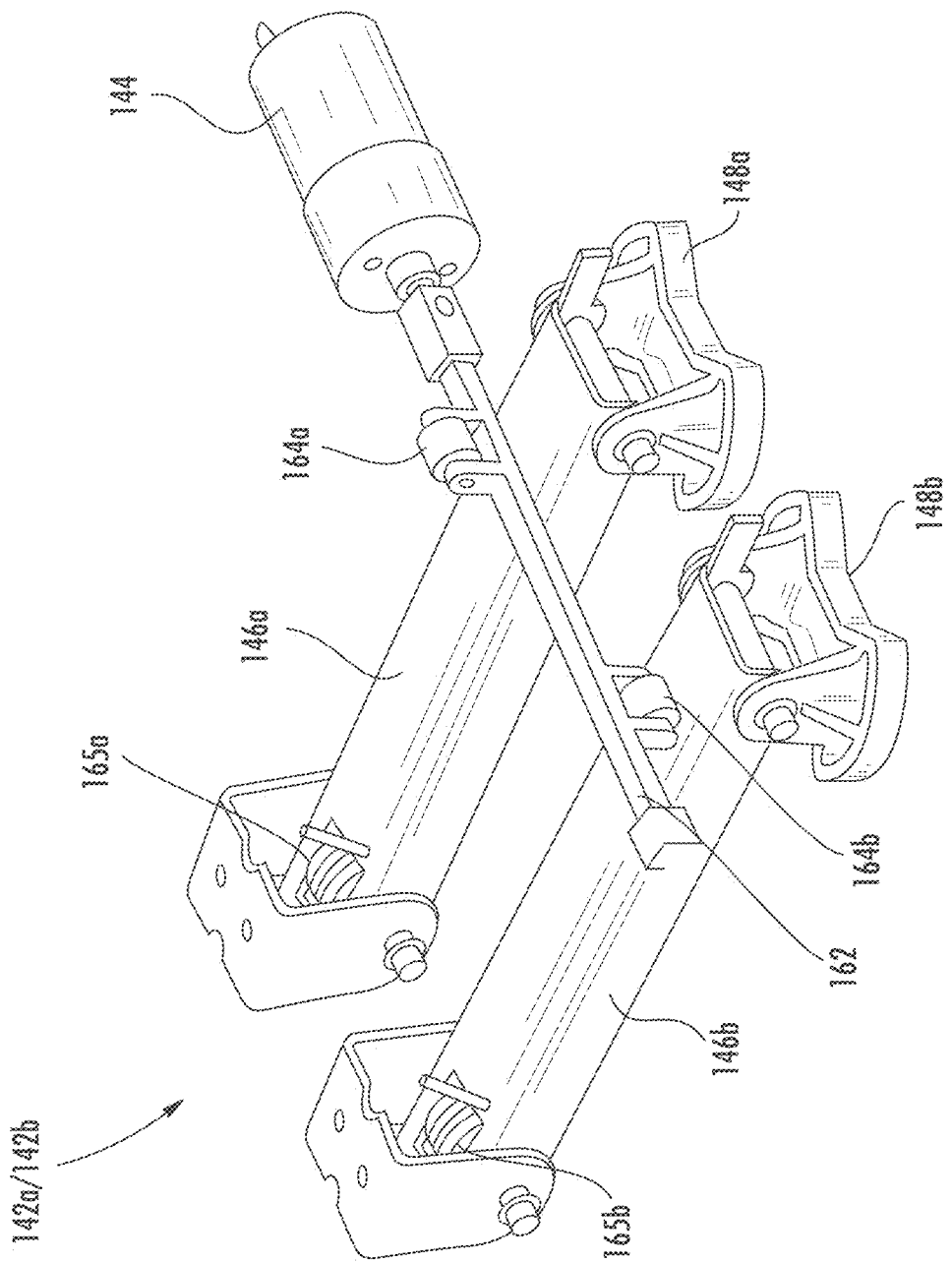

Client - #24601

| Service Date | #1 3/2 | #2 4/11 | #3 5/30 |
|---|---|---|---|
| Recommended Amount | 118.3 | 116.3 | 116.7 |
| Dispensed Amount | 118.3 | 116.3 | 116.7 |
| Unused Amount | 3.7 | 0.9 | 0 |
| Additional Amount | 0 | 0 | 1.0 |
| Used Amount | 114.6 | 115.4 | 117.7 |

*FIG. 17*

DYE DISPENSING SYSTEM

CROSS-REFERENCE TO RELATED APPLICATIONS

The present Application for Patent is a continuation of U.S. application Ser. No. 15/956,490, filed Apr. 18, 2018, now U.S. Pat. No. 10,206,478, and entitled "DYE DISPENSING SYSTEM", which is assigned to the assignee hereof and which is hereby incorporated by reference herein in its entirety for all purposes.

BACKGROUND

Hair coloring compositions are used for coloring human hair. Color service is a profitable area in the salon industry and can be a significant part of the cost structure of operating a salon. The components that are used to create hair coloring compositions are generally distributed separately in containers such as tubes or bottles and allow the stylist to create custom blends per client. Additionally, the components of the hair coloring composition are provided separately to prolong their useful life and avoid adverse chemical reactions that may occur if combined together.

There is a lot of waste in the salon industry with respect to color service. To create a custom hair coloring composition, the stylist utilizes small amounts of several different components such as colorant, coloring compound, dye or coloring chemicals from one or more containers. When a small amount of the component is used, the remainder of the component in the container may become waste because once the component is exposed to oxygen, such as when the container is opened, it may degrade in as little as a few days.

Not only is the remainder of the component in the container waste, but also the container itself along with its packaging. Moreover, some stylists lack the knowledge and skills required to select and mix the components to obtain the proper color formulation ratios for the custom hair color composition. These mistakes, mixture inaccuracies such as mixing too much product, inconsistencies and "do-overs" contribute to more waste.

SUMMARY

A system is disclosed herein including at least one scanner identifying an identification associated with a receptacle. At least one dispenser is configured to dispense the first desired amount of the formulation into the receptacle. At least one dispensing area has a measuring instrument. The instrument measures a dispensed amount of the formulation in the receptacle and an unused amount of the formulation in the receptacle, and associates the measured dispensed amount and the unused amount with the identification. At least one storage device stores a program, and at least one controller which, when executing the program, is configured to receive information and associate the information with the identification. The information comprises at least one of stylist information, client information of a client, attributes of hair of the client, a formulation, a type of application for the formulation, a location on a head of the client for the formulation, and a first desired amount of the formulation. Collected data associated with the identification is recorded. The collected data is comprised of the information, the dispensed amount of the formulation, and the unused amount of the formulation, to a file in a database. A second desired amount of the formulation based on at least some of the collected data in at least one file in the database is recommended. The at least one scanner, the at least one dispenser, the at least one instrument and the at least one storage device are in communication with the at least one controller. The at least one dispenser is controlled by the at least one controller based on the first desired amount of the formulation or the second desired amount of the formulation. The at least one dispenser is configured to dispense the second desired amount of the formulation.

A method is disclosed herein including a dye dispensing system receiving a receptacle having an identification in a dispensing area. A scanner of the dye dispensing system identifies the identification associated with the receptacle. A controller of the dye dispensing system receives information and associates the information with the identification. The information comprises at least one of stylist information, client information of a client, attributes of hair of the client, a formulation, a type of application for the formulation, a location on a head of the client for the formulation, and a first desired amount of the formulation. A first dispenser of the dye dispensing system dispenses the first desired amount of the formulation into the receptacle. A measuring instrument in the dispensing area measures a dispensed amount of the formulation in the receptacle and the measured dispensed amount is associated with the identification. After the receptacle has been removed from the dispensing area, the receptacle is received in the dispensing area. The scanner reads the identification associated with the receptacle and the information associated with the identification. The instrument measures an amount of unused formulation in the receptacle and the measured unused amount is associated with the identification. The controller records collected data comprising the information, the measured dispensed amount, and the measured unused amount, to a file in a database. The controller recommends a second desired amount of the formulation based on at least some of the collected data from at least one file in the database. A second dispenser dispenses the second desired amount of the formulation. The second dispenser is controlled by the controller based on the second desired amount of the formulation.

BRIEF DESCRIPTION OF THE DRAWINGS

FIGS. 6A and 6B show a perspective view and a side view of the coupler for use in the apparatus shown in FIG. 1 in accordance with some embodiments;

FIG. 6C is a perspective view of a nozzle for use in the dye dispensing apparatus shown in FIG. 1 in accordance with some embodiments;

FIGS. 8B and 8C illustrate the dispenser in the dye dispensing apparatus in accordance with some embodiments;

FIGS. 9A and 9B depict embodiments with a first dispenser and a second dispenser in accordance with some embodiments;

FIG. 17 illustrates a portion of a file of a client, in accordance with some embodiments;

DETAILED DESCRIPTION

Figure 1:
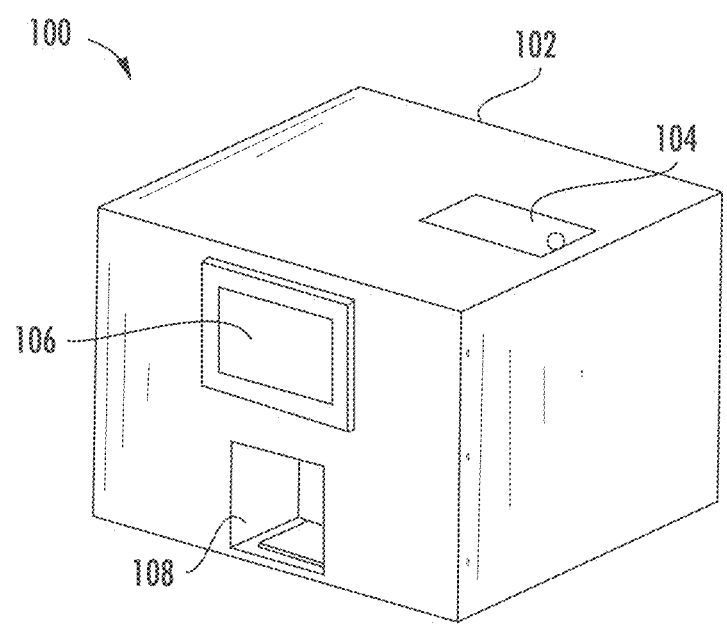
FIG. 1 is a perspective view of a dye dispensing apparatus in accordance with some embodiments.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

There is a lot of waste in the salon industry with respect to color service. When performing a color service, the stylist may mix too much product to be used on the client. The unused, leftover product cannot be reused and is discarded. The unused product is typically not measured, so from a business side, the salon cannot quantify the losses in inventory, costs and profits due to unused, discarded product. Moreover, the stylist continues the same process time after time, continuing the same mistakes.

The system and method disclosed herein measures, records and tracks the unused product so that based on at least some collected data, a recommendation for a desired amount of the formulation is generated. The dispenser of the dye dispenser apparatus may be controlled by the controller of the dye dispenser apparatus based on the recommended desired amount of the formulation. In this way, the amount unused product is minimized or eliminated, which saves the salon money in inventory, reduces costs and increases profits. The waste created from the used containers of the product and the associated packaging is decreased, which helps the environment. By using the system and method, the stylist has minimal input on the amount of product mixed, thereby, eliminating the mistake of mixing too much product.

The dye dispensing apparatus, system and method described herein dispenses dye for hair coloring with the ability to produce a relatively large number (e.g., approximately 4,000) unique color formulations, and a suite of optional treatments with computer controlled, precision dispensing. The unique color formulations may be created by master chemists and produced in large batches remotely, such as at a factory, then packaged in recyclable, refillable and reusable canisters. The dye dispensing apparatus, system and method may dispense the dye from the canister such as "base tones" or "base levels" which may comprise a large portion of the dispensed color formulation; "pure tones" or "tonal values" which are highly concentrated dyes of particular colors; and "developer" which may be different strengths of peroxide and bleach. Combining these ingredients produce unique color formulas. The dye in the canisters may consist of permanents, semi-permanents, demi-permanents, bleaches/lighteners, color refreshers, temporaries, toners or developers. In another embodiment, the developer is not provided in canisters or dispensed by the dye dispensing apparatus, but is supplied in a conventional container. The canisters are configured with an internal valve that enables approximately all of the dye in the canister to be dispensed without contamination. The system also includes the functionality of inventory management and communications.

The dye dispensing apparatus, system and method may monitor the individual canisters and transmit actual dispensed amounts to the network or central server (e.g., a cloud-based application, a standalone server device, etc.) which, in turn, may automate inventory management by initiating automated direct replenishment shipments of the canisters. The dye dispensing system may be operated by stylists using control panels or Apps on mobile devices such as a laptop, tablet, smartphone or Web browser. Commands may be transmitted to the system from software operating on an online server or from the central server.

FIG. 1 is a perspective view of a dye dispensing apparatus in accordance with some embodiments. A dye dispensing apparatus 100 has a housing 102 made from metal, plastic, composites or a combination thereof. The housing 102 may be equipped with mounting holes to allow the apparatus to be mounted on a wall, secured to a countertop, mounted on a cart or for multiple apparatuses 100 to be coupled together. A door 104 may be located in the upper area of the housing 102 or in the side wall of the housing 102 for access to the inside of the housing 102 such as for loading and unloading canisters or resolving any concerns that may arise. The door 104 may have a lock option. A panel 106 with a screen or display may be used to enter inputs for communication with the apparatus 100 or overall dispensing system, or to serve as an information center. For example, the panel 106 may display a power mode, a login function, a queue for dispensing, and system messages. The hair color or dye may be dispensed in a dispensing area 108, such as a nook, located in a lower area of the housing 102.

Figure 2A:
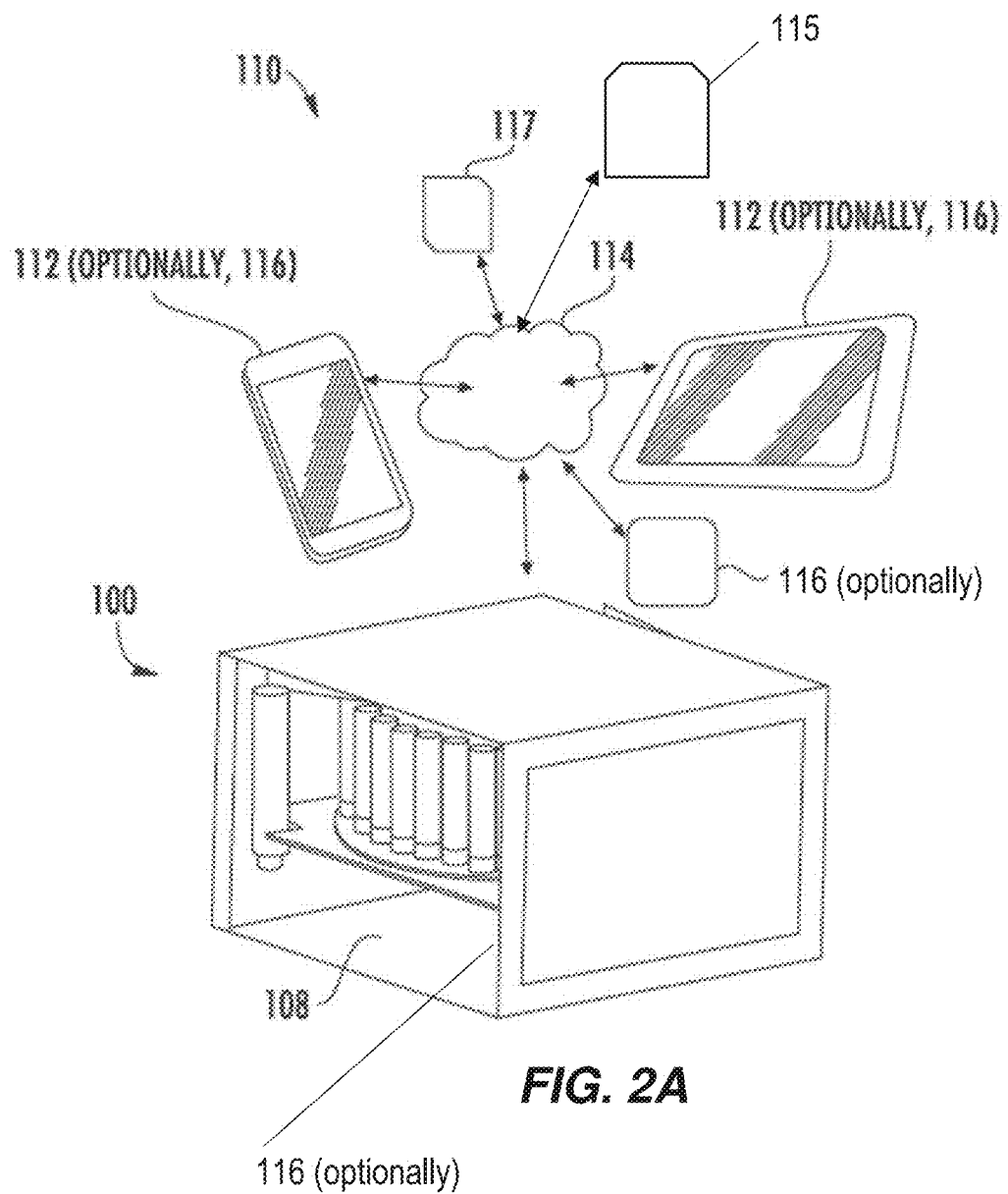
FIGS. 2A and 2B are simplified schematic diagram of a dye dispensing system environment incorporating the apparatus in accordance with some embodiments.
Figure 2B:
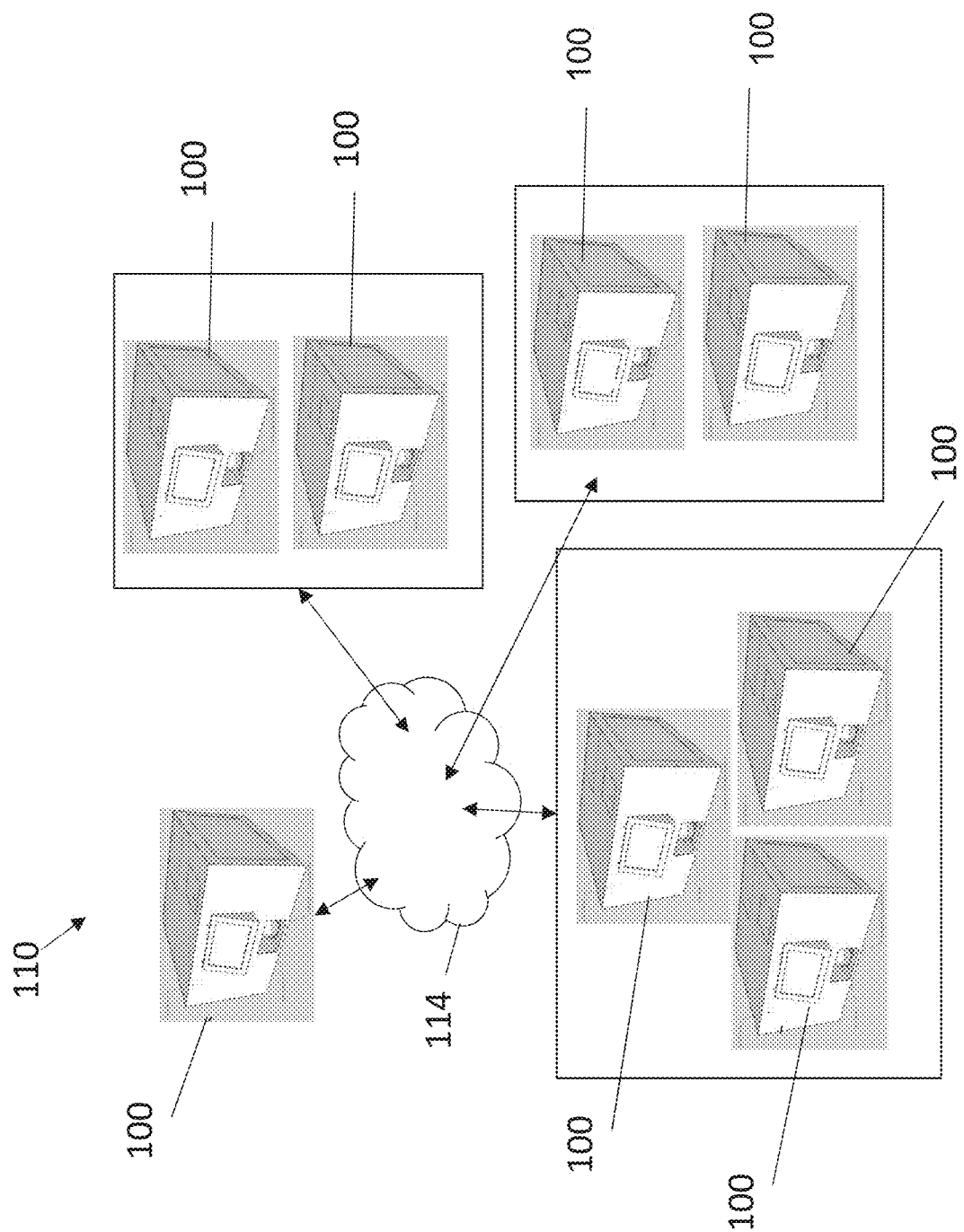

FIGS. 2A and 2B are simplified schematic diagrams of a dye dispensing system 110 environment incorporating the apparatus 100 in accordance with some embodiments. For example, at least one apparatus 100 may be in communication with one or more mobile devices 112 through a network 114. The apparatuses 100 may be located at the same salon, multiple salons or locations, or a combination thereof. The apparatus 100 includes a controller 116. The controller 116 may be contained within the housing 102 or located remotely from the apparatus 100, and in communication with the system 110 through the network 114, such as the Internet, a wide area network (WAN), a local area network (LAN), etc. Thus, the controller 116 may be a micro-control unit embedded in the apparatus 100, a separate standalone remote controller or computer, a cloud-based application, or other appropriate device or combination of devices. The controller 116 may include one or more CPU or processor boards, computer displays, touch screens and interface hardware. The communication or transmitting may be wired or wireless (or a hybrid combination thereof) and may be achieved through a WiFi system, Bluetooth® wireless technology, Ethernet, router, cellular communications, satellite communications or the like. The system may also be capable of performing as a WiFi hub. In various embodiments, the controller 116 is a laptop, computer or mobile device such as a tablet or mobile phone. In another embodiment, a user interface may be part of the controller 116 such as when the controller 116 is configured as a laptop, computer, tablet or mobile device 112, and may be used to enter inputs for communication with the apparatus 100 or system 110, or as an information center.

A dye formulation identifies at least one dye and an amount of the dye. This may be the recipe to create the hair coloring compositions for the coloring service to be performed on a client. The dye formulation may be comprised of data 117 from an internal database, an external database or input from a user.

Through the network 114, requests, commands, responses and data may be transmitted. The apparatus 100 and system 110 may support the Dynamic Host Configuration Protocol (DHCP) assignment of internal IP addresses and may initiate communications over the network 114 in response to inputs. The network 114 may utilize Ethernet and Internet protocols such as TCP/IP, UDP, HTTP or HTTPS and data formats such as HTML, JSON or XML for these transactions. In various embodiments, these communications may include user interface interactions, periodic apparatus 100 timeouts, a system 110 event such as the canister being inserted or removed, or the completion of the dispensing sequence. Communications between the apparatus 100 and the controller 116 may be via a direct or independent access channel through the network 114. In the event that the primary network connectivity becomes unavailable, a backup system may be used, that is capable of reporting GPS coordinates and supporting operating communications.

In another embodiment, referring to FIG. 2B, multiple apparatuses 100 are located at one site, such as a salon, or at multiple sites, and may be linked together through the network 114, creating the dye dispensing system 110. As shown in FIG. 2A, there may be one central controller 115 or server connecting each dispensing apparatus 100, and acting as a hub to collect data and distribute commands to the multiple dye dispensing systems 110. The central controller 115 may receive and transmit data, information or commands. Providing a network 114 in this manner enables high quality customer service and color formulation analytics.

Figure 3:
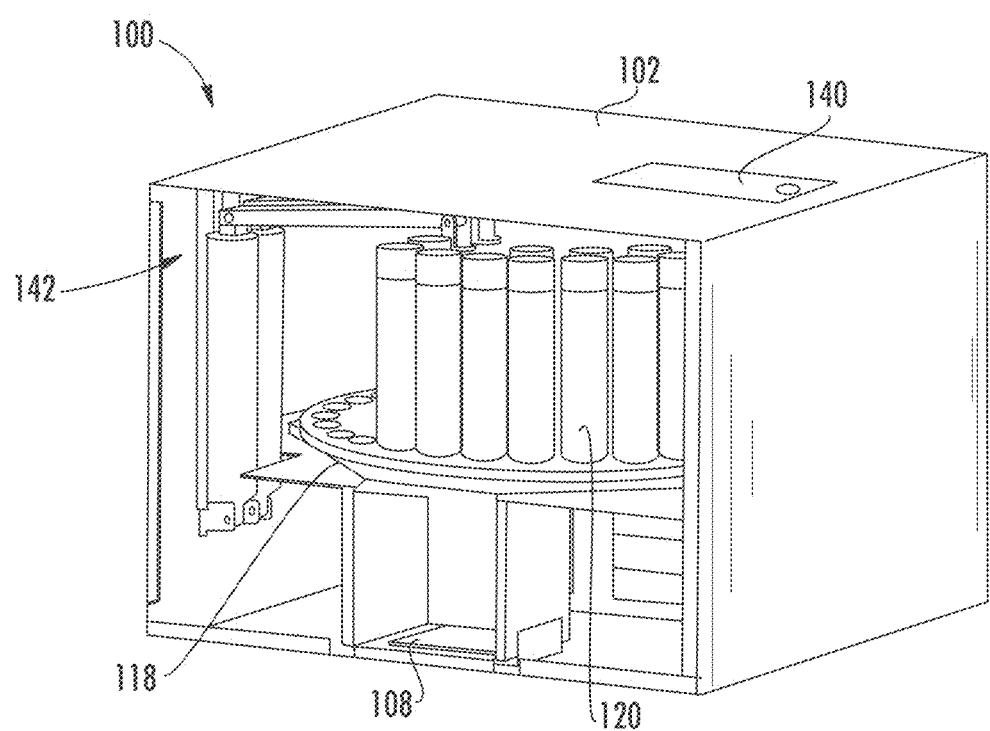
FIG. 3 is a perspective view of a portion of an interior of the dye dispensing apparatus shown in FIG. 1 in accordance with some embodiments.
Figure 4A:
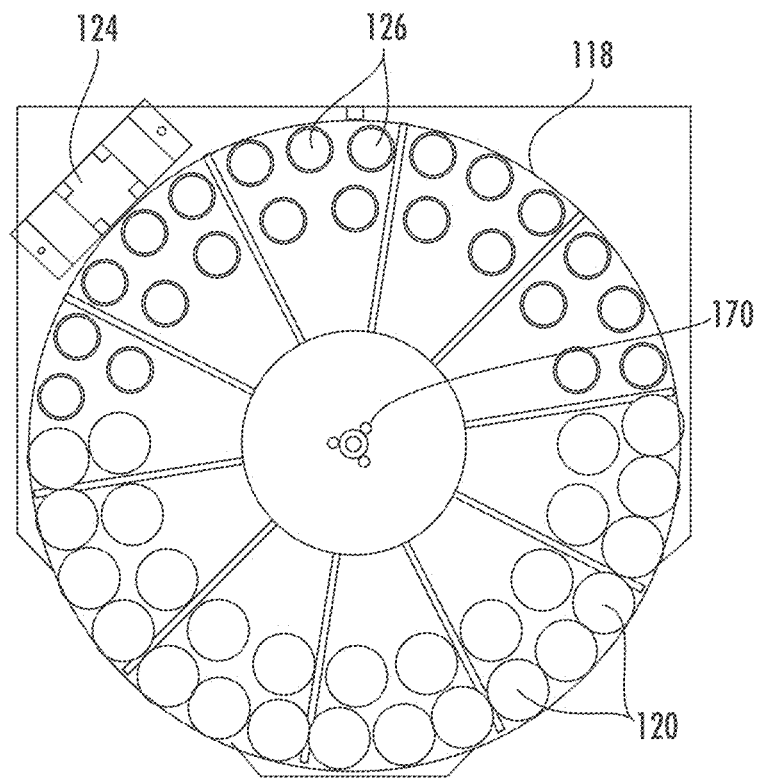
FIG. 4A shows a top view of a portion of the apparatus shown in FIG. 1 in accordance with some embodiments.
Figure 4B:
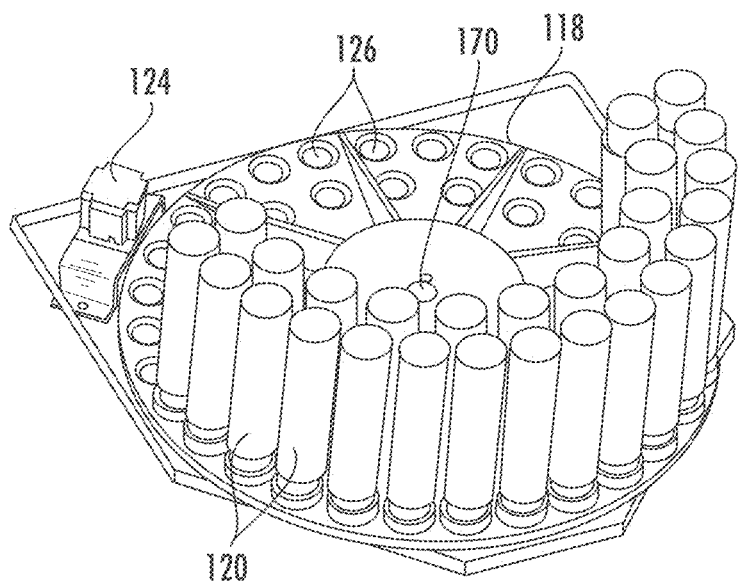
FIG. 4B shows a perspective view of the portion of the apparatus shown in FIG. 4A in accordance with some embodiments.

FIG. 3 is a perspective view of a portion of an interior of the dye dispensing apparatus 100 shown in FIG. 1 in accordance with some embodiments. FIG. 4A shows a top view of a portion of the apparatus 100 shown in FIG. 1 in accordance with some embodiments, and FIG. 4B shows a perspective view of the portion of the apparatus 100 shown in FIG. 4A in accordance with some embodiments. A tray 118 within the housing 102 may be coupled to the housing 102 and is configured to hold at least one canister 120. A bearing 170 may be coupled to the tray 118, enabling the tray 118 to rotate. The tray 118 may have any shape such as a round, carousel configuration and may be operated by a drive mechanism 124 such as a motor. The tray 118 communicates with the controller 116. In other embodiments, the tray 118 is fixed. The tray 118 is configured with at least one opening 126.

In some embodiments, there may be multiple rows of openings 126, such as two concentric rows shown in FIGS. 4A-4B. For example, the tray 118 may contain up to 50 openings 126 arranged in two rows, having an inner row with 20 openings 126 and an outer row with 30 openings 126. In other embodiments, the tray 118 may be square-shaped with 40 openings 126 arranged in four rows. In yet another embodiment, the tray 118 may be octagonal-shaped with 40 openings 126 arranged in clusters. The shape of the tray 118 and the arrangement of the openings 126 is customizable depending on the application. The ability to change the size, shape and number of openings enables the apparatus 100 to be reduced in overall size to accommodate space constraints in the salon. Moreover, the overall size of the apparatus 100 can be reduced if the particular application requires a small number of canisters 120. For example, the salon may offer a limited amount of color formulations thus only needing 10 canisters 120 instead of up to 50 canisters 120.

Figure 5A:
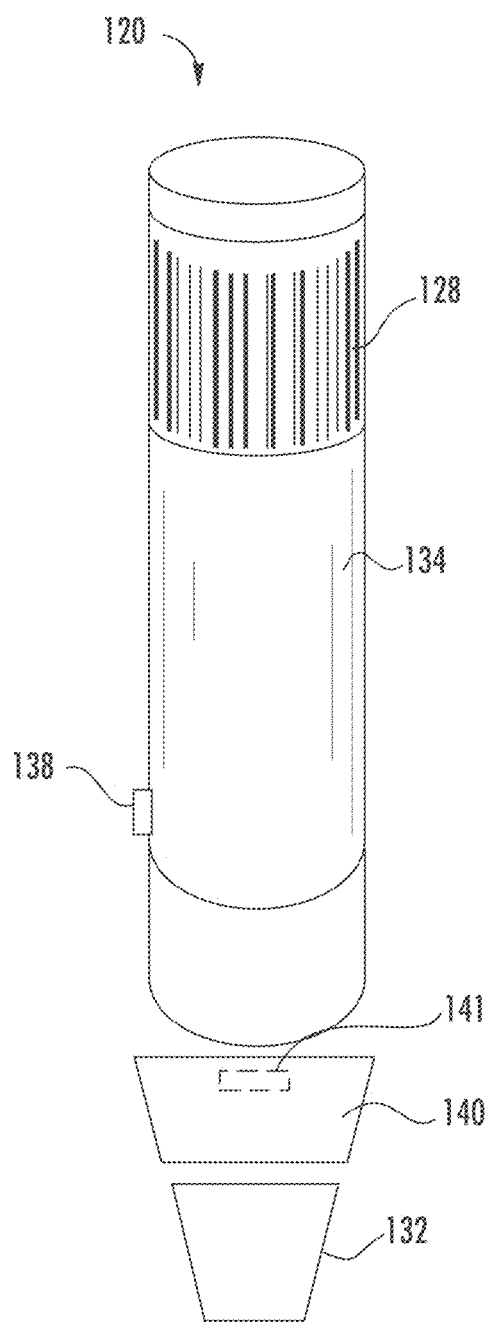
FIG. 5A is a perspective view of a canister for use in the dye dispensing apparatus shown in FIG. 1 in accordance with some embodiments.
Figure 5B:
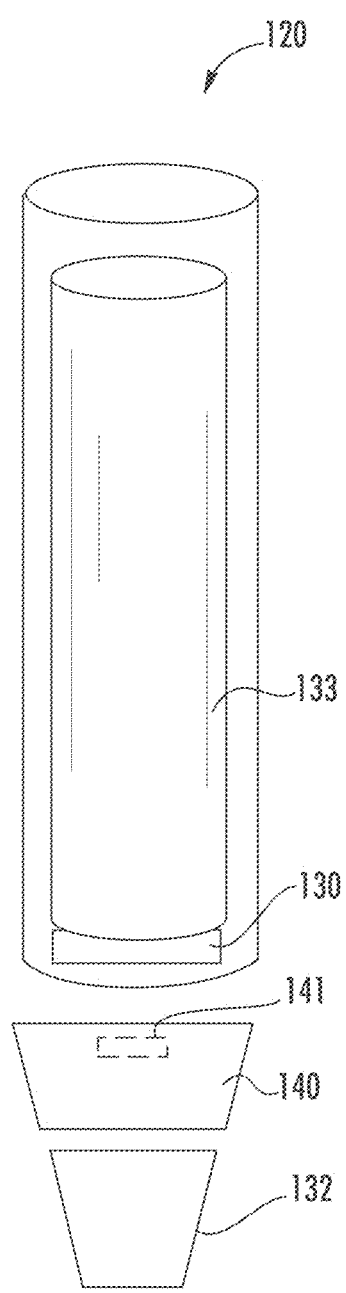
FIG. 5B is a simplified schematic view of a canister for use in the dye dispensing apparatus shown in FIG. 1 in accordance with some embodiments.

FIG. 5A is a perspective view of a canister 120 for use in the dye dispensing apparatus 100 shown in FIG. 1 in accordance with some embodiments and FIG. 5B is a simplified schematic view of a canister 120 for use in the dye dispensing apparatus 100 shown in FIG. 1 in accordance with some embodiments. At least one canister 120 is coupled to the at least one opening 126 of the tray 118. Each canister 120 is configured with an identifier 128, an internal valve 130, a nozzle 132, a sleeve 133 and dye 134. The sleeve 133 is configured to contain the dye 134. In one embodiment, the canister 120 is modular and interchangeable with one another. The storage capability may be, for example, up to 8.6 ounces but may also vary depending on the size of the sleeve. In practice, the dye 134 cannot be exposed to air until just before the color treatment. Therefore, the canisters 120 are airtight and may be composed of a metal such as aluminum, composite or a combination thereof.

Each canister 120 is labeled with a unique identifier 128 such as a barcode, QR code, catalog number or icon code. Identifier 128 may be scanned, read and recognized by a device such as a reader 136. The reader 136 may be a standalone unit or part of the controller 116 and located within the housing. The reader 136 may be coupled to the side wall or top wall of the housing, on the dispenser or any location with a direct view of the canisters 120. Other technologies may be used for uniquely identifying the canisters 120 such as by RFID (radio-frequency identification) technology, NFC (near-field communication) technology or the like. In some embodiments, the identifier 128 verifies the presence of the canister 120 in the apparatus 100 and identifies the particular contents in the canister 120 such as the color of the dye 134. Other information may be included in the identifier 128 such as the product name, date the canister 120 was filled with the particular dye 134, the amount of the dye remaining in the canister 120, a lot or batch number and any other notes the manufacturer may wish to include.

The reader 136 communicates with the controller 116. The reader 136 is configured to scan, read and recognize the identifier 128 labeled on the canister 120 and communicates the information to the controller 116. The controller 116 may recognize the information embedded in the identifier 128 such as product name, quantity remaining in the canister 120 and lot or batch number. In another embodiment, there may be two or more readers 136 designed to identify the canister 120 located in particular areas of the tray 118. For example, one reader 136 may identify the canisters 120 in an inner row of the tray 118 while another reader 136 identifies the canisters 120 in the outer row of the tray 118.

The canister 120 may be recyclable, refillable and reusable in the system 110 and is configured to be pressurized by a gas. The canister 120 may include a port 138 for injecting the gas. For example, the canister 120 may be a nitrogen pressurized canister 120. The gas and dye 134 are separated within the canister by an internal sleeve that enables the dye 134 to move uniformly downward towards an internal valve 130 when external force or pressure is exerted on the canister 120. FIGS. 6A and 6B show a perspective view and a side view of a coupler 140 for use in the apparatus shown in FIG. 1 in accordance with some embodiments. The canister 120 couples to the coupler 140 at the bottom end of the canister 120 where the dye 134 is dispensed. In some embodiments, the coupler 140 may be integral to openings 126 in the tray 118, integral to the canister 120 or a separate component. The coupler 140 supports the canister 120 in the opening 126. For example, the valve 130 is located on the bottom end of the canister 120. When a force is applied on the top of the canister 120, the valve 130 is pushed against a protrusion 141 on the coupler 140, thus opening the valve 130 and allowing and dye 134 to be dispensed through the nozzle 132. The internal valve 130 enables the canister 120 to dispense approximately all of the contents within, such as the dye 134, through the nozzle 132 via the apparatus 100. In another embodiment, the canister 120 utilizes a gravity-feed system in which gravity is used to move the dye 134 downward through the canister 120.

FIG. 6C is a perspective view of a nozzle 132 for use in the dye dispensing apparatus 100 shown in FIG. 1 in accordance with some embodiments. The nozzle 132 may be made from plastic, metal, composite or the like and coupled to the coupler 140 or the sleeve 133. In this way, contamination is prevented because each canister 120 has its own nozzle 132. Thus, only the dye 134 from the particular canister 120 flows through the nozzle 132 as opposed to many different dyes 134 flowing through the same nozzle 132.

Figure 7A:
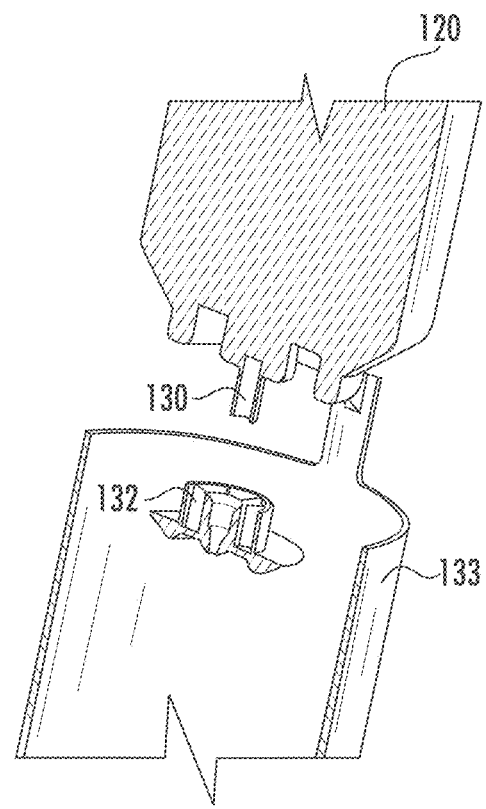
FIGS. 7A and 7B show cross sectional views of the canister for use in the dye dispensing apparatus shown in FIG. 1 in accordance with some embodiments.
Figure 7B:
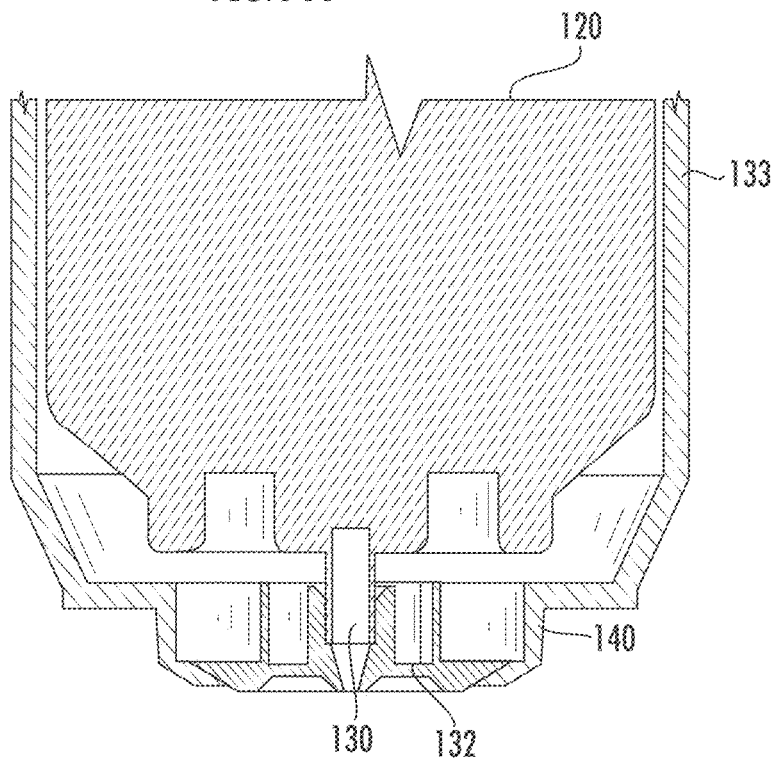

FIGS. 7A and 7B show cross sectional views of the canister 140 for use in the dye dispensing apparatus 100 shown in FIG. 1 in accordance with some embodiments. In some embodiments, the sleeve 133 is located external from the canister 120 and is integral with the coupler 140 thus the sleeve and coupler may be one component. The nozzle 132 fits inside of the coupler 140 and has angled walls. The dye 134 is held in the pressurized canister 120. The valve 130 protrudes from the bottom end of the canister 120. When the valve 130 is pushed, it allows the dye 134 inside of the canister 120 to flow out of the canister 120.

The nozzle 132 rests on the inside surface of the sleeve 133. The internal pressure inside of the canister 120 enables the valve 130 to be in a closed position, (e.g., no dye 134 will flow out of the canister 120). When force is applied to the top end of the canister 120 by the actuator 144, the valve 130 is depressed in a vertically upward direction (e.g., inside of the canister 120), creating an opposing force on the nozzle 132 which opens the valve 130 and releases the dye 134. As more force is applied by the actuator 144, the flow volume of the dye 134 increases.

Figure 8A:
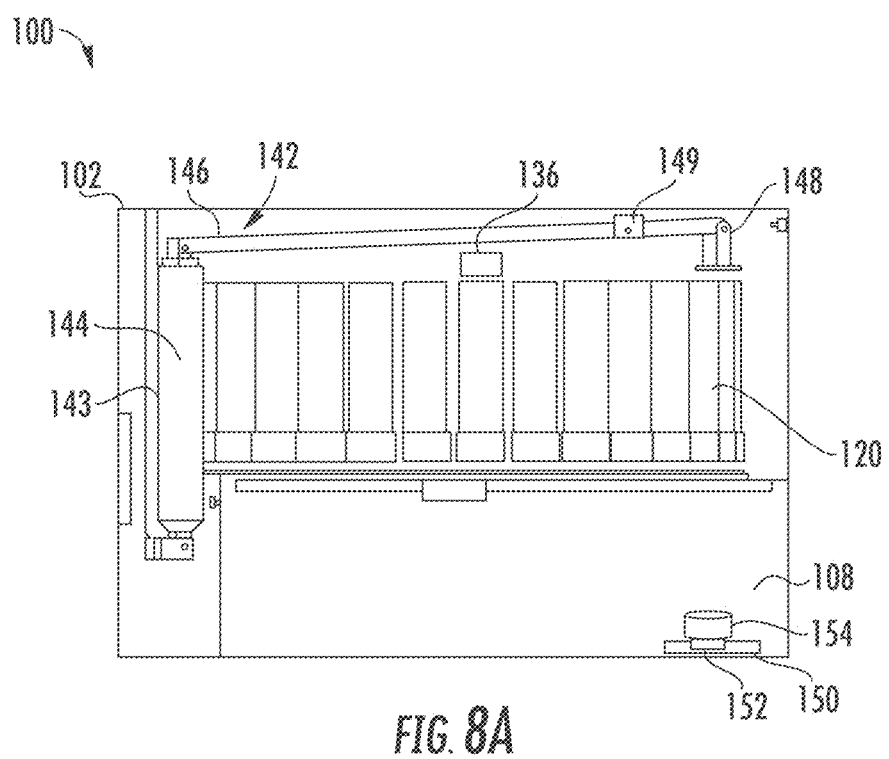
FIG. 8A shows the interior of the dye dispensing apparatus in accordance with some embodiments.
Figure 8B:
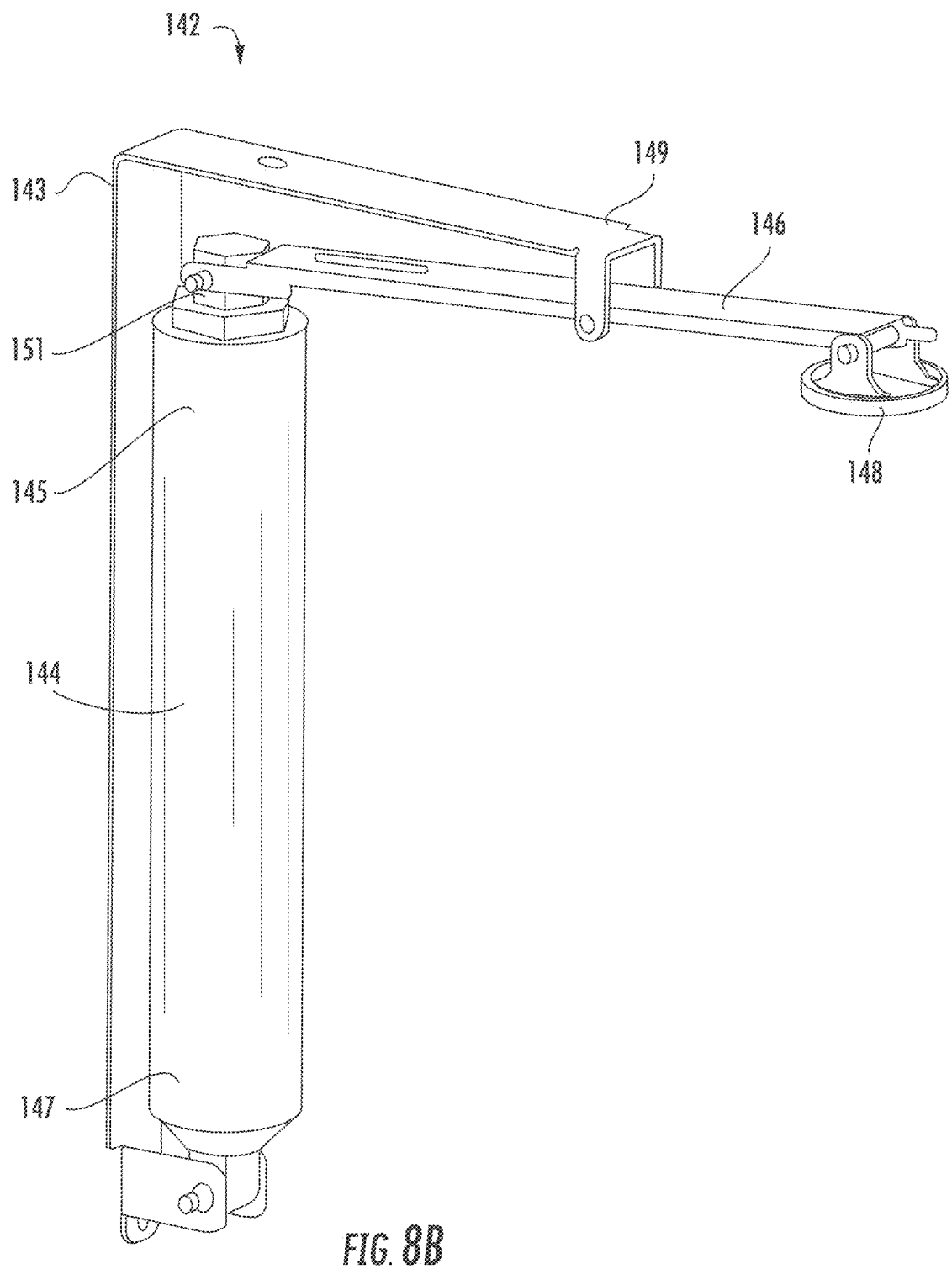

FIG. 8A shows the interior of the dye dispensing apparatus 100 in accordance with some embodiments, and FIGS. 8B and 8C illustrate a dispenser 142 in the dye dispensing apparatus 100 in accordance with some embodiments. The dispenser 142 includes at least one actuator 144. The actuator 144 can include mechanical and electrical components such as a solenoid, motor and/or piston and rod assembly; a lever arm 146; and a projection 148. The actuator 144 communicates with the controller 116. The actuator 144 is coupled to a first end of the lever arm 146, and the projection 148 is coupled to a second end of the lever arm 146. A mounting bracket 143 couples the dispenser 142 to a surface such as the housing 102. For example, in the embodiment of FIGS. 8A-8C the mounting bracket 143 is L-shaped, with one end coupled to the second end 147 of the actuator 144 and the other end coupled to the lever arm 146. The mounting bracket 143 is coupled to the lever arm 146 at a junction 149. The junction 149 serves as a support and a pivot point for the lever arm 146. When the actuator 144 is activated, an internal rod 151 of the actuator 144 is moved in an upward direction causing the lever arm 146 coupled to the first end of the actuator 144 to also move in an upward direction. At the junction 149, the lever arm moves in a downward direction, as in a teeter-totter effect, thus enabling the projection 148 to move in a downward direction and contact the surface of the canister 120 (not shown). This action applies pressure on the canister 120 and the dispensing of the dye 134 begins. FIG. 8B depicts the rod 151 of the actuator 144 non-activated and retracted. FIG. 8C shows the rod 151 of the actuator 144 during dispensing, where the rod 151 is activated and extended vertically upward.

In the embodiment of FIGS. 8B-8C, the projection 148 is configured to pivot and rotate enabling full contact with the top of the canister 120. The projection 148 is a component that extends from the end of the lever arm 146 and in some embodiments, the projection 148 may be part of the lever arm 146. The projection 148 is designed to optimally mate with the top surface of the canister 120. In some embodiments, projection 148 may have a flat or curved surface with a spring-like material such as plastic or rubber to provide flexibility and suction. In other embodiments, the projection 148 is composed of a rigid material providing resistance to the top surface of the canister 120.

When the canister 120 is aligned with a dispensing area 108, the dispenser 142 applies a downward force on the canister 120 and dispenses the dye 134. For example, the controller 116 communicates with the reader 136. The reader 136, based on the identifier 128, identifies a selected dye 134 in a selected canister 120 associated with the dye formulation. The selected canister 120 is aligned with the dispensing area 108. The controller 116 communicates with the actuator 144 which activates and positions the lever arm 146 with the projection 148 directly above the selected canister 120. The dispenser 142 applies a downward force on the selected canister 120 while the projection 148 is in direct contact with top surface of the canister 120. This opens the valve 130 of the canister 120 and causes dye 134 to escape through the nozzle 132 of the canister 120. The dye 134 is dispensed in quantities such as 0.01 grams to 140.00 grams and in any programmed ranges.

The controller 116, via the dispenser 142, starts and stops the dispensing of the dye 134 allowing for variable dispensing rates. For example, the dispensing may start slow, increase, level off and then decrease as it approaches dispensing the required amount of dye 134. The rate of dispensing may be customized depending on the amount of dye to be dispensed and the time the apparatus 100 needs to complete the dye formulation.

Figure 9A:
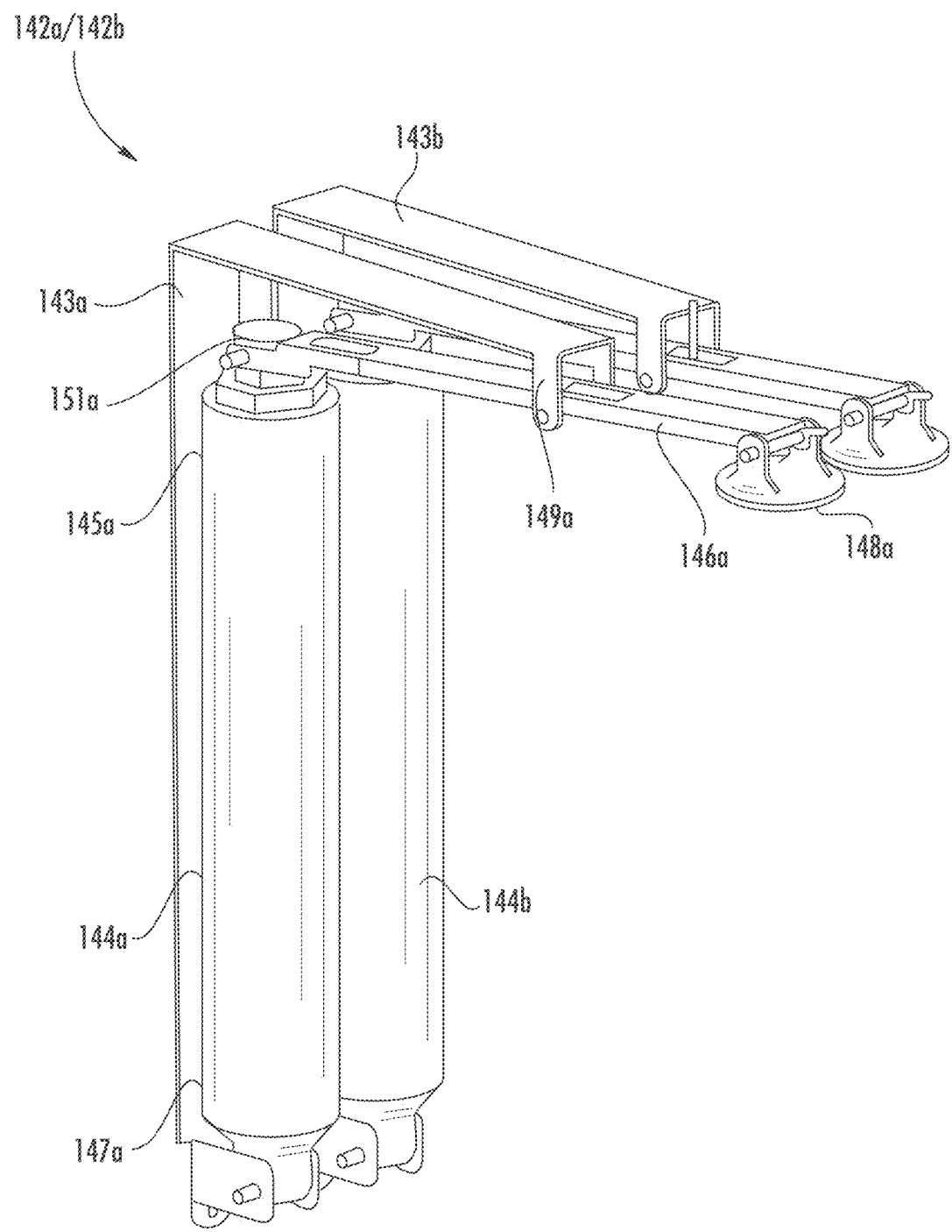

In another embodiment, there may be a second dispenser in the apparatus 100. FIGS. 9A and 9B 9A and 9B depict embodiments with a first dispenser and a second dispenser in accordance with some embodiments. The first dispenser 142a has a first actuator 144a, a first end of the first actuator 145a, a second end of the first actuator 147a, first lever arm 146a, a first projection 148a and a first junction 149a. The second dispenser 142b has similar components as the first dispenser 142a but for clarity, are not labelled. Mounting brackets 143a and 143b respectively, couple the dispensers 142a and 142b to the surface. In FIG. 9A, the first dispenser 142a and the second dispenser 142b each have an actuator 144a and 144b respectively but in other embodiments, may share the actuator 144. In FIG. 9B, the first dispenser 142a and the second dispenser 142b share the actuator 144.

The embodiment shown in FIG. 9A, depicts independent dispensers 142a and 142b. This may be used when the canisters 120 on the tray 118 are in a round, carousel configuration with an inner row and outer row of canisters 120. The dispensers 142a and 142b may operate one at a time, alternately or simultaneously. The operation of the first dispenser 142a and a second dispenser 142b is the same as described with reference to FIGS. 8A, 8B and 8C.

In the embodiment shown in FIG. 9B, the single actuator 144 such as a motor, activates one dispenser 142a or 142b at a time. A cam 162 with rollers 164a and 164b is coupled to the actuator 144. The rollers are 180° from one another in this embodiment. Springs 165a or 165b located on the lever arm 146a or 146b aid in holding the projection 148a or 148b off of the canisters 120. When the cam 162 rotates in a clockwise or counterclockwise direction, the roller 164a or 164b contacts the lever arm 146a or 146b and overcomes the tension of the springs 165a or 165b forcing the roller 164a or 164b to contact the lever arm 146a or 146b causing it to move in a downward direction. For example, when the rollers 164a or 164b contact the lever arm 146a or 146b, it creates a force that overcomes the spring tension, causing the lever arm 146a or 146b to move downward. Thus, the projection 148a or 148b contacts the canister 120 (not shown) and dispensing begins. To stop the dispensing, the actuator 144 causes the cam 162 to rotate, such as further in the same direction or in the reverse direction, and the pressure from the roller 164a or 164b on the lever arm 146a or 146b is released and the dispensing stops. As the cam 162 rotates, the roller 164a or 164b applies more or less pressure on the lever arm 146a or 146b and in turn, on the canister 120. This starts and stops the dispensing of the dye 134 allowing for variable dispensing rates as described herein.

The apparatus 100 further includes a measuring instrument 152 (FIG. 8A) communicating with the controller 116. The instrument 152 measures a dispensed amount of the selected dye, and the dispenser stops dispensing when the dispensed amount of the selected dye equals the amount of the dye in the dye formulation for the at least one dye. A plate 150 is located in the dispensing area 108 and vertically below the at least one opening 126 with the selected canister 120. Plate 150 may be configured with the instrument 152 to measure the contents on the plate 150. The instrument 152 may be a transducer, a scale, a gauge such as a strain gauge, or a combination thereof. A receptacle 154 is located on top of the plate 150. The receptacle 154, such as a cup or a bowl, collects the dye 134 as it is dispensed from the canister 120. The receptacle 154 may lock or snap into the plate 150 to ensure stability. The instrument 152 measures the amount of dye 134 dispensed then communicates this data to the controller 116. In one embodiment, the dispensing will not occur unless the receptacle is in the proper position. This may be indicated visually with an indicator light. The measuring and stopping steps for each of the at least one dye 134 may be repeated until the dye formulation is complete.

Figure 10:
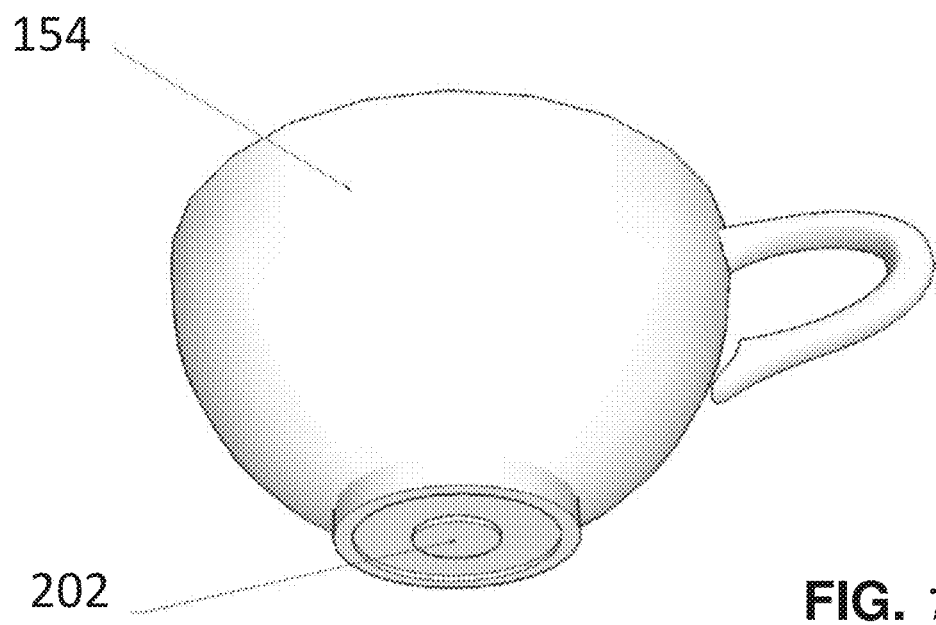
FIG. 10 depicts a receptacle with an identification, in accordance with some embodiments.

The receptacle 154 may be uniquely identified by having an identification 202. In some embodiments, the identification 202 is configured to store information and may be selected from a group consisting of a radio-frequency identification (RFID) tag, barcode, or quick response (QR) code. FIG. 10 depicts the receptacle 154 with the identification 202, in accordance with some embodiments. The identification 202 may be permanently affixed to or embedded in the receptacle 154, e.g., in a bottom portion of the receptacle as shown.

Figure 11:
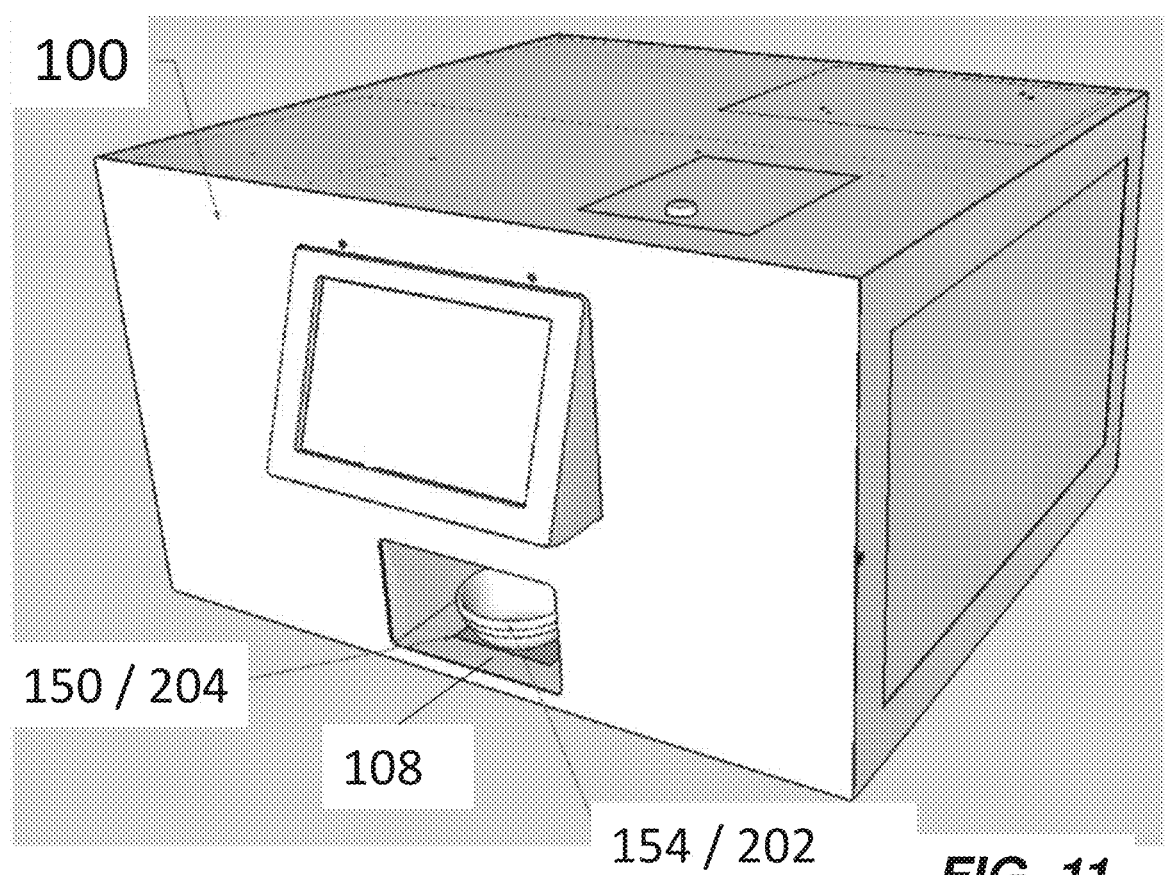
FIG. 11 shows the receptacle in the dispensing area of the apparatus, in accordance with some embodiments.

Information may be received by the controller 116 and the information is associated with the identification 202 so that the information is tracked with the identification 202. Thus, the identification 202 and the information are stored in a computer memory connected to the controller 116. The information comprises at least one of stylist information, client information of a client, attributes of hair of the client, a formulation, a type of application for the formulation, a location on a head of the client for the formulation, and a first desired amount of the formulation. A scanner 204, in communication with the controller 116, is coupled to the plate 150 in the dispensing area 108 and configured to read the identification 202 and the information associated with the identification 202. FIG. 11 shows the receptacle 154 in the dispensing area 108 of the apparatus 100, in accordance with some embodiments. The receptacle 154 with the identification 202 is identified by the scanner 204 on the plate 150.

Figure 12:
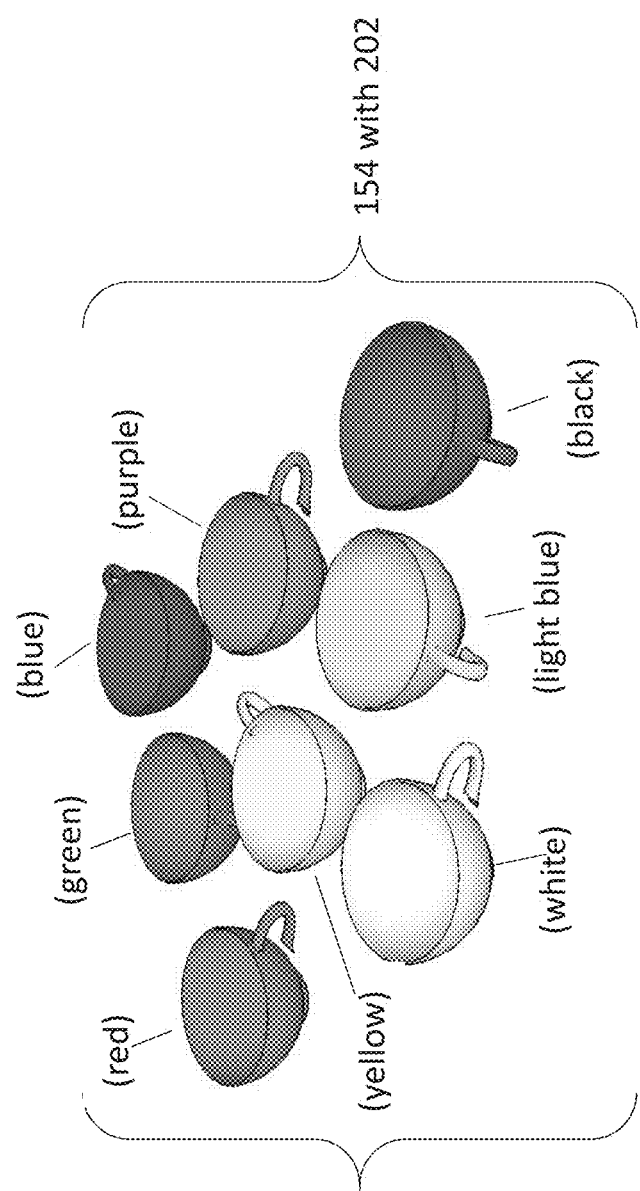
FIG. 12 depicts the receptacle with the identification as various colors, in accordance with some embodiments.
Figure 13:
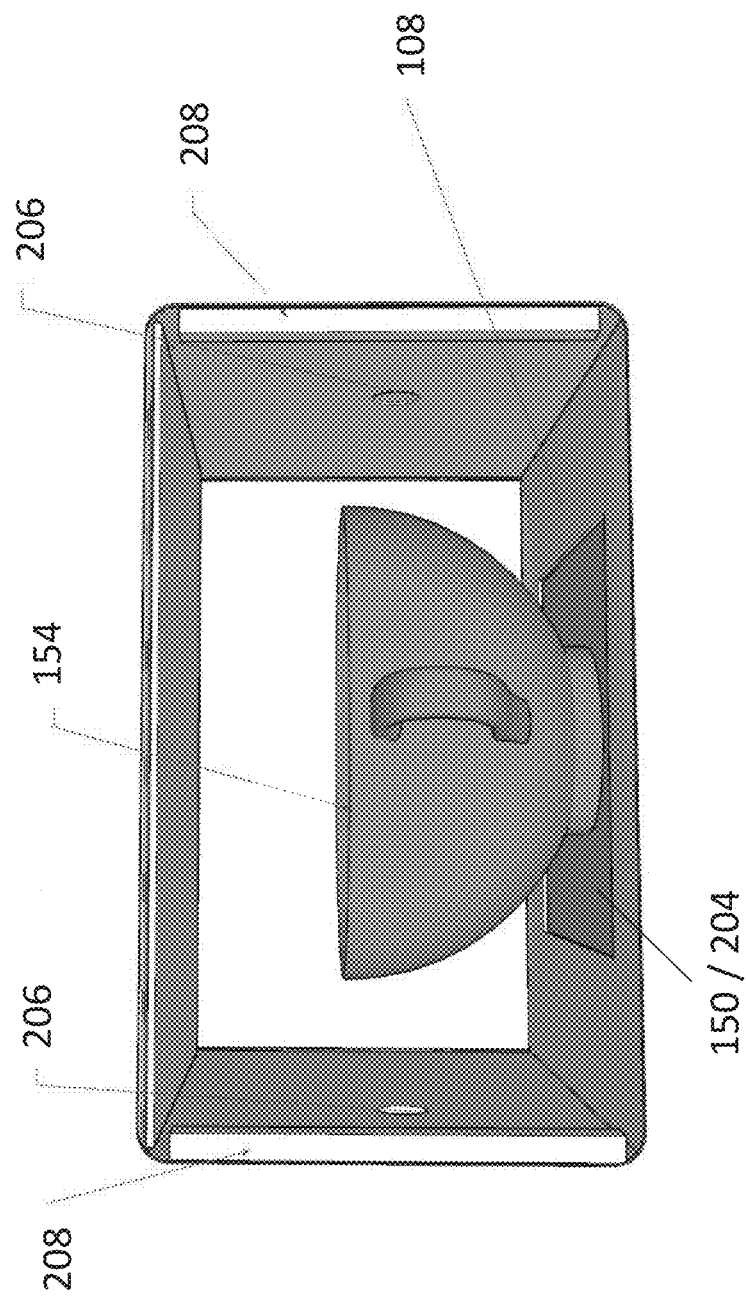
FIG. 13 depicts the receptacle in the dispensing area, in accordance with some embodiments.

The receptacle 154 may be comprised of a plastic, composite or resin in various colors and may be reusable after thoroughly cleaning after use. In some embodiments, the identification 202 is a particular color of the receptacle 154, for example, red, green, blue, purple, black, light blue, white or yellow. FIG. 12 depicts the receptacle 154 with the identification 202 as various colors, in accordance with some embodiments. In this example embodiment, the scanner 204 is one or more optical color sensors 206 to detect color, specifically, the color of the receptacle 154. For example, one or more light emitting diodes (LEDs) 208 may illuminate the dispensing area 108, and hence the receptacle 154, when the receptacle 154 is on the plate 150. FIG. 13 depicts the receptacle 154 in the dispensing area 108, in accordance with some embodiments.

In some embodiments, the receptacle 154 is a particular color and the optical color sensors 206 sense RGB color codes of the receptacle 154 and transmit these to the controller 116. The controller 116 defines the color from the RGB color codes and uses the color as the identification 202. In this scenario, the information received from the controller 116 is associated with the identification 202, e.g., color, and stored in the computer memory. In some embodiments, camera technology may be used to identify the color. When the receptacle 154 is in the dispensing area 108, the scanner 204 automatically reads the identification 202 and the controller 116 automatically reads the information associated with the identification 202.

Figure 14:
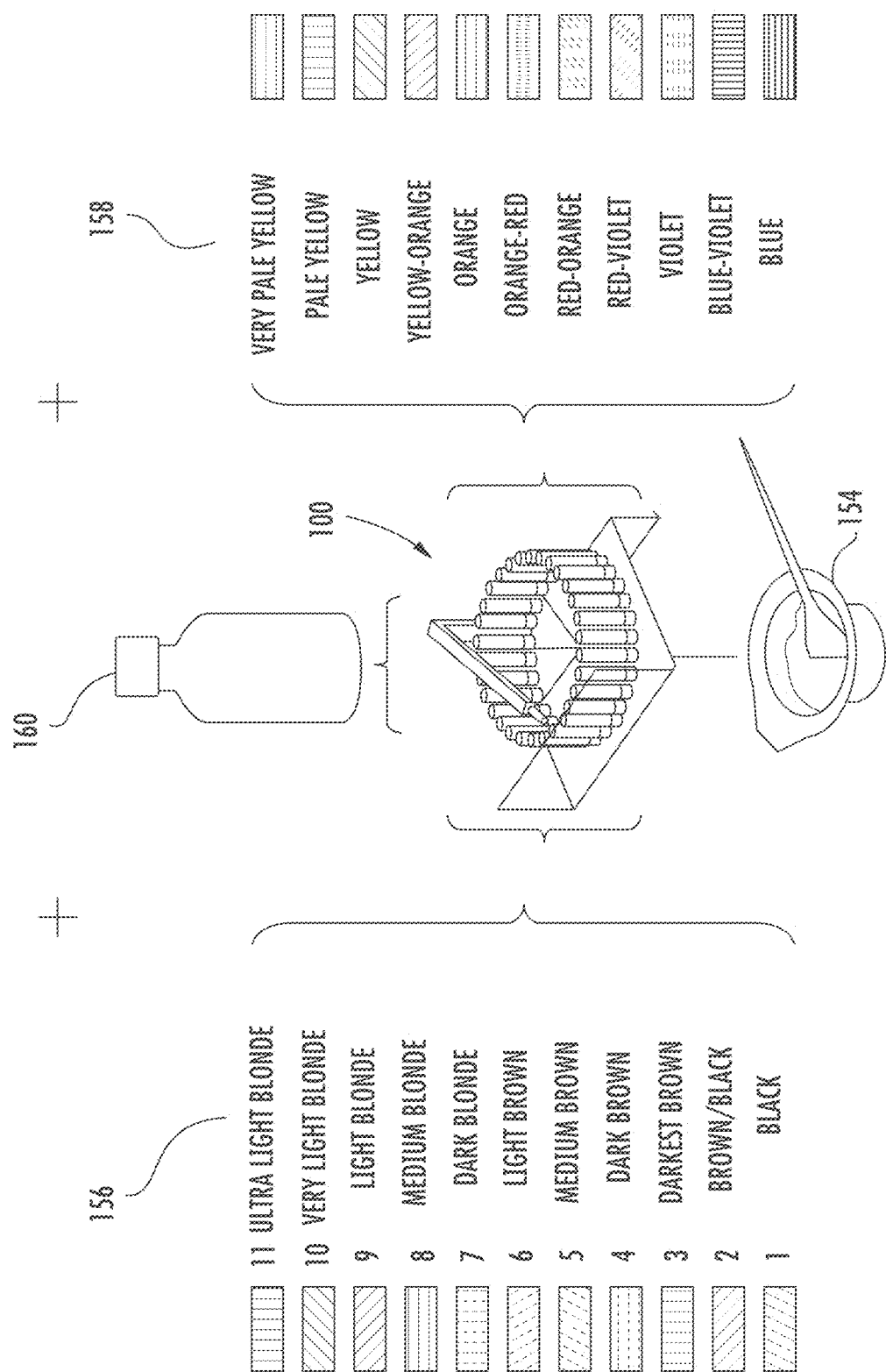
FIG. 14 illustrates a simplified schematic of components used in a method for preparing a dye formulation in accordance with some embodiments.

Typically, the salon industry relies on the knowledge and ability of the stylist to create the dye formulation, distributing the correct amount of the dye comprising the dye formulation and hand mixing. This may lead to inaccuracies and non-repeatable results. The present dye dispensing system and method offers unique hair coloring compositions in recyclable, refillable and reusable canisters reduces waste and improves hair color services with dye formulations and dispensing control, thus retaining customers while providing new client opportunities. FIG. 14 illustrates a simplified schematic of components used in a method for preparing a dye formulation in accordance with some embodiments. In this embodiment, the components may be base levels 156 of various colors and tonal values 158 of different pigments contained in the canisters 120. These components are dispensed by the apparatus 100 according to the dye formulation and collected in the receptacle 154. A developer 160 of, for example, 5-40% may be added to or be part of the dye formulation to produce the final hair coloring composition to use on the hair of a client.

Figure 15:
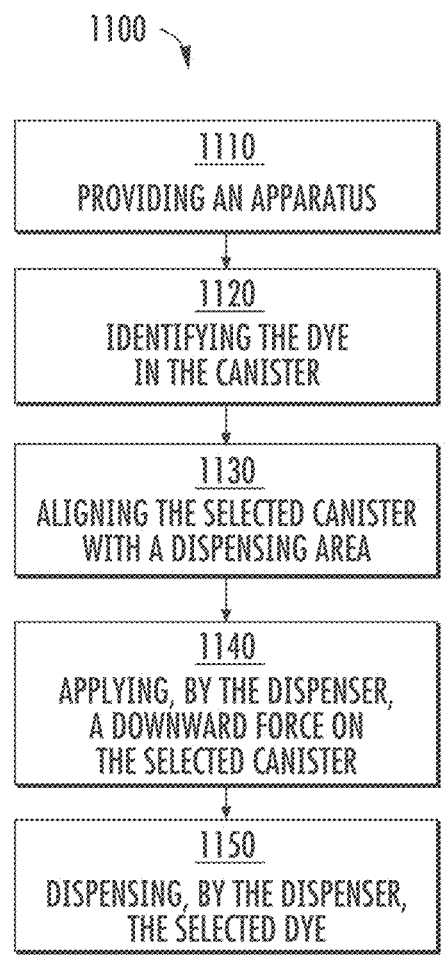
FIG. 15 is a flowchart for a method for preparing a dye formulation in accordance with some embodiments.

FIG. 15 is a flowchart for a method for preparing a dye formulation in accordance with some embodiments. The dye dispensing method 1100 includes at step 1110, providing a dye dispensing apparatus. The apparatus includes a controller and a tray. The tray communicates with the controller and is configured with at least one opening. At least one canister is configured with an identifier and a dye. The dye is associated with the identifier. A reader communicates with the controller. A dispenser comprises an actuator communicating with the controller and a lever arm. The lever arm is coupled to the actuator and configured with a projection.

At step 1120, the reader, based on the identifier, identifies a selected dye in a selected canister associated with a dye formulation. At step 1130, the selected canister is aligned with the dispensing area. At step 1140, the dispenser applies a downward force on the selected canister. At step 1150, the selected dye is dispensed.

In a non-limiting example, a client would like to change the color of her hair. To use the dye dispensing apparatus 100 and method 1100, the stylist uses a user interface such as a device 112, such as a laptop, computer, tablet or mobile phone. This may be through an App or software package or program. The stylist inputs information about the client on which the dye formulation will be applied, such as color desired, length of hair, thickness of hair and texture of hair. The controller 116 generates a request for the dye formulation based on the information. The dye formulation is comprised of data 117 from an internal database, an external database or input from a user. For example, in some embodiments, the dye formulation may be created by the controller 116 accessing a database stored in the controller 116 or stored remotely from the apparatus 100 or the user may input the dye formulation.

The dye formulation includes an identifier 128 and a specified amount of dye 134 for each of at least one dye 134. The dye formulation, like a recipe, may be comprised of at least one dye 134, including the identifier 128 and quantity of each dye 134 needed to complete the dye formulation. In this example, three different dyes 134 are required for the dye formulation. For example, 0.1 grams of dye F1, 5.05 grams of dye F2 and 4.03 grams of dye F3 comprise the dye formulation.

In one embodiment, a formulation code is generated and inputted into the panel 106 of the apparatus 100 or through the user interface, the device 112, such as a computer, laptop, tablet or mobile phone which may be the same as the controller 116. The formulation code may also be associated with the particular stylist and be used to track different information or aspects by stylist. For example, the stylist enters the formulation code on the touch screen, or panel 106, located on the apparatus 100. In another embodiment, the stylist enters the information on a personal mobile device 112. The controller 116 then transmits a signal to the reader 136 and the reader 136 reads the identifier 128 on the canisters 120 and identifies a selected dye 134 in a selected canister 120 associated with a dye formulation such as dye F1 based on the identifier 128. The controller 116 transmits a signal to a drive mechanism 124 such as a motor, and in this embodiment, the drive mechanism 124 rotates the tray 118 until the selected canister 120, dye F1, is aligned with the dispensing area 108. The actuator 144, such as the actuator, receives a signal from the controller 116, and the lever arm 146 is moved or translated until the projection 148 is directly above the selected canister 120 of dye F1. A downward force is applied on the selected canister 120 of dye F1 by the actuator 144 and through the lever arm 146 and projection 148 applying pressure on the selected canister 120 of dye F1. In one embodiment, 10-15 psi of pressure is applied for approximately 0.01 seconds to 3.0 seconds so that 0.01 grams of dye F1 is dispensed. The dye 134 is dispensed through the nozzle 132 and collected in the receptacle 154 which is positioned on the plate 150 of the dispensing area 108.

The instrument 152, such as the transducer, coupled to the plate 150 measures the dispensed amount of the selected dye 134 associated with the dye formulation and provides feedback to the controller 116, so that the controller 116 can stop the dispenser 142 from dispensing. The dispenser 142 stops the dispensing when the dispensed amount of the selected dye 134 equals the amount of the dye in the dye formulation for the at least one dye 134. This ensures the precise quantity of dye dispensed. In this example, the instrument 152 measures the dispensed dye F1 and transmits a signal to the controller 116 reporting that 0.01 grams of dye F1 was received. The controller 116 then sends a signal to the reader 136 to find the next identifier 128, dye F2, in the dye formulation. The steps in the method are repeated, as well as repeating the measuring and stopping steps for each of the at least one dye 134 until the dye formulation is completed. This includes identifying the canister 120 for dye F2, rotating the tray 118, dispensing the selected dye 134 and measuring the amount of dye dispensed. The method 1100 is then repeated to dispense the contents of dye F3. Once the contents of dye F1, dye F2 and dye F3 are dispensed, the dye formulation is complete. In some embodiments, F1, F2, F3 to F(x) may also be a developer instead of a dye. When the dye formulation is complete, the stylist is notified by an indicator light and/or a message on the user interface or panel 106.

In some embodiments, the dispenser 142 may initially dispense too much of the first dye 134 in the dye formulation, such as of F1 in the dye formulation. If this occurs, the controller 116 will perform adjustments in the values of the other dyes 134 in the dye formulation such that the proper ratios of F1, F2 and F3 are dispersed to obtain the target color.

The canisters 120 may be recyclable, refillable and reusable so that when all of the dye 134 is dispensed from the canister 120 and the canister 120 is empty, the canisters 120 may be refilled and reloaded into the dye dispensing apparatus 100. In one embodiment, the canister 120 is refilled remotely by the manufacture and then shipped to the salon. The refilled canister 120 may be loaded in the apparatus 100 through the door 104 in the housing 102.

The apparatus, system or method may send notifications in the form of an indicator light, messages on the user interface or the like, during operation. For example, the stylist may be provided with instructions on the user interface to load a particular canister 120. This may occur if the required dye 134 within the canister 120 is not available in the apparatus 100, or if a particular canister runs out of dye during dispensing, or if the dye dispensing apparatus, system or method malfunctions.

To reduce the waste in the salon industry with respect to color service, its useful to accurately recommend, or predict, and accurately measure the amount of dye formulation needed per application on the client. To accurately recommend the amount of dye formulation needed, many factors need to be considered. For example, each stylist has their own way or style of applying the dye formulation which may require more or less of the dye formulation for the same client and service than for a different stylist. Other factors that influence the amount of dye formulation needed are different attributes of the hair of the client, such as type of hair, thickness of hair, and length of hair, the type of application for the formulation, such as highlights, root-boost or all over color, and the location on a head of the client where the formulation is applied such as roots only, all over, or only a portion of the ends of the hair.

Figure 16:
FIG. 16 is a simplified flowchart of a method for recommending a desired amount of the formulation in a color service, in accordance with some embodiments.

The dye dispensing system 110, as shown in FIGS. 2A and 2B, may be used in non-limiting example such as the method 1600 for recommending a desired amount of the formulation in a color service. FIG. 16 is a simplified flowchart of the method 1600, in accordance with some embodiments. The specific steps, order of steps, and combination of steps are shown for illustrative and explanatory purposes only. Other embodiments may use other specific steps, orders of steps, and/or combinations of steps to perform generally the same or similar overall function.

In the non-limiting example, a client requests a color service. The assigned stylist may use the device 112, such as a mobile phone, a tablet, a computer, a kiosk, a smartwatch or the like, to enter information about herself (e.g., the stylist), the client and the service. The information may comprise at least one of stylist information, client information of a client, attributes of hair of the client, a formulation, a type of application for the formulation, a location on a head of the client for the formulation, and a first desired amount of the formulation. This information is transmitted by the network 114 and received by the controller 116. In this example, the controller 116 is located in the apparatus 100 but may also be located remotely from the apparatus 100. The information may be stored in a computer memory or the database.

At step 1610, the dye dispensing system 110 may receive a receptacle 154 having an identification 202 in the dispensing area 108, such as when the stylist places the receptacle 154 in the dispensing area 108. As described herein, the identification 202 may be a RFID tag, barcode, quick response (QR) code, or color of the receptacle 154. In this embodiment, the identification 202 is an RFID tag.

At step 1612, the scanner 204 of the dye dispensing system 110 identifies or reads the identification 202 associated with the receptacle 154. At step 1614, the controller 116 of the dye dispensing system 110 receives the information from the device 112 and associates the information with the identification 202. The information, as defined in this example, may comprise at least one of stylist information such as an ID number unique to the stylist; client information of a client such as name, address and phone number; attributes of the hair of the client such as length of hair, thickness of hair, degree of natural curliness; a formulation to be applied on the client such as the custom color composition, formula or recipe; a type of application for the formulation such as root-boost, highlights, color all-over or a portion of the ends of the hair; a location on a head of the client for the formulation such as on the roots only, all of the hair, or only the ends of the hair; and a first desired amount of the formulation. The first desired amount of the dye formulation may be comprised of the data 117 from an internal database, an external database or input from a user. At step 1616, a first dispenser 142a of the dye dispensing system 110 dispenses the first desired amount of the formulation into the receptacle 154.

At step 1618, the measuring instrument 152 in the dispensing area 108 measures a dispensed amount of the formulation in the receptacle 154 and the measured dispensed amount is associated with the identification 202. This may occur automatically, without user input. The stylist may remove the receptacle 154 and start the service on the client.

Once the stylist completes the service, the receptacle 154 may be returned to the dispensing area 108 so that the unused formulation may be measured. For example, at step 1620, after the receptacle 154 has been removed from the dispensing area 108, the receptacle 154 is received back in the dispensing area 108. At step 1622, the scanner 204 reads the identification 202 associated with the receptacle 154 and the controller 116 automatically reads the information associated with the identification 202. At step 1624, the instrument 152 measures an amount of unused formulation in the receptacle 154, and the measured unused amount is associated with the identification 202. At step 1626, the controller 116 records collected data comprising the information, the measured dispensed amount, and the measured unused amount, to a file in a database. The database may be internal to the controller 116 or may be located at the central controller 115. Optionally, a used amount of the formulation may be calculated from the dispensed amount of the formulation and the amount of unused formulation. This may be associated with the identification 202 and recorded to the file in the database.

At step 1628, the controller 116 recommends a second desired amount of the formulation based on at least some of the collected data from at least one file in the database. Step 1628 may occur now or after a large time gap such as on a subsequent visit by the client to the salon when requesting the same color service as the previous visit. At step 1630, a second dispenser 142b dispenses the second desired amount of the formulation. In some embodiments, the first dispenser 142a and the second dispenser 142b are the same such as when the same apparatus 100 is used for both dispensings. This may be the case when the client is at the same salon with only one apparatus 100. In some embodiments, the first dispenser 142a and the second dispenser 142b are different, such as when two different apparatuses 100 are used in the dispensings. This may be the case when the client is at two different salons or the stylist uses different apparatuses 100 located at the same salon.

In some embodiments, the first dispenser 142a is controlled by the controller 116 based on the first desired amount of the formulation. In some embodiments, the second dispenser 142b is controlled by the controller 116 based on the second desired amount of the formulation. The first dispenser 142a and the second dispenser 142b may be the same dispenser.

In some embodiments, the method 1600, measures, records and tracks the collected data comprising of i) the information (e.g., at least one of stylist information, client information of a client, attributes of hair of the client, a formulation to be applied on the client, a type of application for the formulation, a location on a head of the client for the formulation, and a first desired amount of the formulation), ii) the measured dispensed amount, and iii) the measured unused amount. The collected data may also be used to recommend the second desired amount of the formulation in files in the database for all clients. The files serve as a historical account of services performed on the client, and from this, reports and statistics may be generated by the controller 116 or central controller 115 for any subset of data correlated to different characteristics. For example, statistics may be generated by the controller 116 for used amounts of formulations correlated with stylists, clients, attributes of hair, types of applications, or locations on the head of the client. These statistics may be based on one file in the database—one client—or an aggregate of the files in the database—various clients.

FIG. 17 illustrates a portion of a file of a client, in accordance with some embodiments. The file for client #24601 shows accounts from the last three color services in which the same formulation was applied as highlights. The following data was recorded: the first desired amount of the formulation (which becomes the second desired amount of formulation recommended in subsequent services), the dispensed amount of the formulation, the amount of unused formulation, and the additional amount needed to complete the service. From these, the amount of used formulation is calculated. In service #1, 114.6 grams of the formulation was used, in service #2, 115.4 grams of the formulation was used, and in service #3, 117.7 grams of the formulation was used. The hair growth over time of the client may account for the upward trend in the dye formulation used.

For the current service for client #24601, or service #4, the second desired amount of the formulation recommended may be based on the dispensed amount of the formulation and the amount of unused formulation from at least one file in the database, or from an aggregate of the files in the database. In the first example embodiment based on one file such as the current client, 118.3 grams of the formulation may be recommended. In the second example embodiment, the second desired amount of the formulation may be based on at least some of the collected data from an aggregate of the files in the database. For example, the second desired amount of the formulation may be based on all the clients in the database with medium length hair when the current client also has medium hair. In this case, 116.0 grams may be recommended as the second desired amount of the formulation.

The collected data from an aggregate of the files in the database to recommend the second desired amount of the formulation may be useful for a new client requesting a color service. For example, if the new client requests a root-boost color service, the average amount of formulation used for all clients in the database for the root-boost color service could be used. By following the steps in method 1600, a file is created for the new client with the collected data so that for the next color service, the file of the client can be consulted.

A calculation of the second desired amount of the formulation reduces waste of the formulation relative to the first desired amount of the formulation. By using the method 1600, the recommendation of the second desired amount of formulation may be the same as the amount of the used formulation thereby reducing or eliminating the unused amount of formulation leftover in a color service that is typically discarded. This has significant impacts on the salon by reducing overall inventory. This in turn reduces the containers and packaging associated with the inventory thus lessening the burden on the environment. It aids the stylist, especially those lacking the knowledge and skills required to select and mix the components to obtain the proper amount of formulation for the color service to avoid errors in mixing too much product, inconsistencies and "do-overs" which contribute to more waste.

Incentives for stylists may be implemented based on various aspects. Data may be tracked by stylist, so the stylist with the least amount of unused formulation may be rewarded. In some embodiments, data aggregated from multiple files in the database may be used for training purposes. Moreover, an assistant to the stylist may be utilized by performing some of the tasks such as the measuring of the receptacle 154 to free up time and workload of the stylist.

In some embodiments, the stylist may run out of the formulation during the color service. In this case, the receptacle 154 may be returned to the dispensing area 108. The scanner 204 reads the identification 202 associated with the receptacle 154 and the controller 116 automatically reads the information associated with the identification 202. In this way, the apparatus 100 determines all of the information without user input. The controller 116 may transmit inquires to the device 112 or the panel 106 of the apparatus 100 to determine the status of the color service such as percentage completed. The controller 116 may calculate an additional amount of formulation needed to complete the color service for the stylist. After the scanner 204 identifies the identification 202 associated with the receptacle 154 and the information associated with the identification 202, a portion of the first desired amount of the formulation is dispensed to be used to finish the color service. This amount may be associated with the identification 202 and recorded to the file in the database. This process occurs quickly, such as within seconds, because the apparatus has all the necessary information due to recognizing the identification 202 on the receptacle 154 and the associated information.

Figure 18:
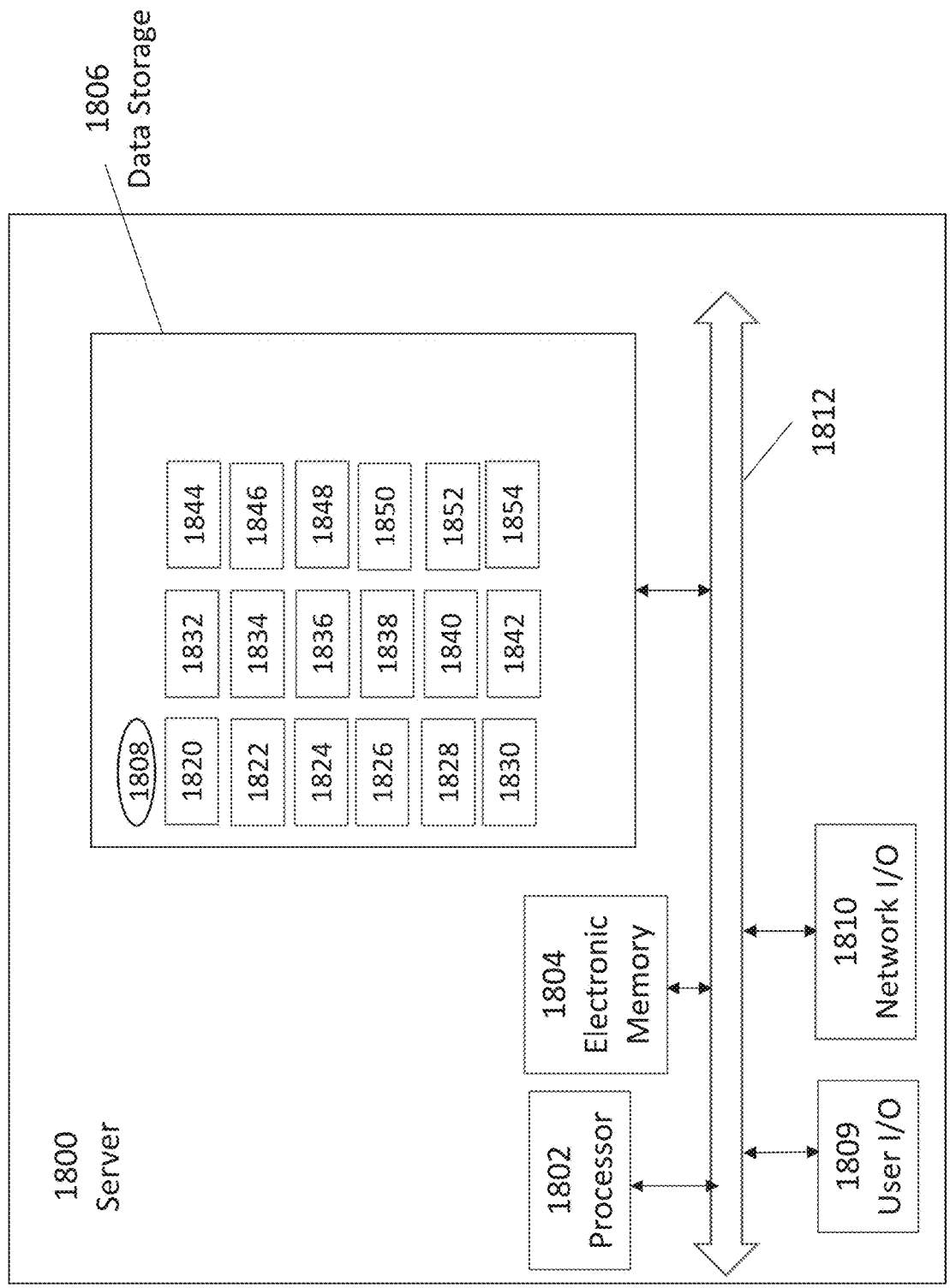
FIG. 18 is a simplified schematic diagram showing an example server for use in the dye dispensing system, in accordance with some embodiments.

FIG. 18 is a simplified schematic diagram showing an example server 1800 (representing any combination of one or more of the servers, e.g., the central controller 115) for use in the dye dispensing system 110, in accordance with some embodiments. Other embodiments may use other components and combinations of components. For example, the server 1800 may represent one or more physical computer devices or servers, such as web servers, rack-mounted computers, network storage devices, desktop computers, laptop/notebook computers, etc., depending on the complexity of the dye dispensing system 110. In some embodiments implemented at least partially in a cloud network potentially with data synchronized across multiple geolocations, the server 1800 may be referred to as one or more cloud servers. In some embodiments, the functions of the server 1800 are enabled in a single computer device. In more complex implementations, some of the functions of the computing system are distributed across multiple computer devices, whether within a single server farm facility or multiple physical locations. In some embodiments, the server 1800 functions as a single virtual machine.

In some embodiments, wherein the server 1800 represents multiple computer devices, some of the functions of the server 1800 are implemented in some of the computer devices, while other functions are implemented in other computer devices. For example, various portions of the dye dispensing system 110 can be implemented on the same computer device or separate computer devices. In the illustrated embodiment, the server 1800 generally includes at least one processor 1802, a main electronic memory 1804, a data storage 1806, a user I/O 1809, and a network I/O 1810, among other components not shown for simplicity, connected or coupled together by a data communication subsystem 1812, within the dye dispensing system 110.

The processor 1802 represents one or more central processing units on one or more PCBs (printed circuit boards) in one or more housings or enclosures. In some embodiments, the processor 1802 represents multiple microprocessor units in multiple computer devices at multiple physical locations interconnected by one or more data channels. When executing computer-executable instructions for performing the above described functions of the server 1800 in cooperation with the main electronic memory 1804, the processor 1802 becomes a special purpose computer for performing the functions of the instructions.

The main electronic memory 1804 represents one or more RAM modules on one or more PCBs in one or more housings or enclosures. In some embodiments, the main electronic memory 1804 represents multiple memory module units in multiple computer devices at multiple physical locations. In operation with the processor 1802, the main electronic memory 1804 stores the computer-executable instructions executed by, and data processed or generated by, the processor 1802 to perform the above described functions of the server 1800.

The data storage 1806 represents or comprises any appropriate number or combination of internal or external physical mass storage devices, such as hard drives, optical drives, network-attached storage (NAS) devices, flash drives, etc. In some embodiments, the data storage 1806 represents multiple mass storage devices in multiple computer devices at multiple physical locations. The data storage 1806 generally provides persistent storage (e.g., in a non-transitory computer-readable or machine-readable medium 1808) for the programs (e.g., computer-executable instructions) and data used in operation of the processor 1802 and the main electronic memory 1804.

In some embodiments, the programs and data in the data storage 1806 include, but are not limited to, a receiver 1820 for receiving an identification; a receiver 1822 for receiving information; an associate 1824 for associating the information with the identification; a recorder 1826 for recording collected data comprising the information, the measured dispensed amount, and the measured unused amount, to a file in the database; a recommender 1828 to calculate and recommend a second desired amount of the formulation based on at least some of the collected data from at least one file in the database; an event scheduler 1830 for coordinating the scheduling of dispensing; a calculator 1832 for preforming calculations; one or more parsing routines 1834 for parsing data; a searching routine 1836 for searching through the various types of information stored in the main electronic memory 1804 or the data storage 1806; a reading routine 1838 for reading information from the data storage 1806 into the main electronic memory 1804; a storing routine 1840 for storing files and information into the main electronic memory 1804 or the data storage 1806; a network communication services program 1842 for sending and receiving network communication through the network 114; a gateway services program 1844 for serving as a gateway to communicate information between servers and users; among other programs and data. Under control of these programs and using this data, the processor 1802, in cooperation with the main electronic memory 1804, performs the above described functions for the server 1800.

The user I/O 1809 represents one or more appropriate user interface devices, such as keyboards, pointing devices, displays, etc. In some embodiments, the user I/O 1809 represents multiple user interface devices for multiple computer devices at multiple physical locations. A system administrator, for example, may use these devices to access, setup and control the server 1800.

The network I/O 1810 represents any appropriate networking devices, such as network adapters, etc. for communicating through the dye dispensing system 110. In some embodiments, the network I/O 1810 represents multiple such networking devices for multiple computer devices at multiple physical locations for communicating through multiple data channels.

The data communication subsystem 1812 represents any appropriate communication hardware for connecting the other components in a single unit or in a distributed manner on one or more PCBs, within one or more housings or enclosures, within one or more rack assemblies, within one or more geographical locations, etc.

The dye dispensing system 110 includes a memory 1804 storing executable instructions (loaded from the data storage 1806) and a processor 1802. The processor 1802 is coupled to the memory 1804 and performs the method 1600 by executing the instructions stored in the memory 1804. The non-transitory computer readable medium 1808 includes instructions that, when executed by the processor 1802, cause the processor 1802 to perform operations including the method 1600 as described herein.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or an assembly/machine language. As used herein, the term "machine-readable medium" (i.e., non-transitory computer-readable media) refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a machine-readable medium. The machine-readable medium can store such machine instructions non-transitorily, such as for example as would a non-transient solid-state memory or a magnetic hard drive or any similar storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor, for displaying information to the user and a keyboard and a pointing device, such as for example a mouse, a touchpad or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Figure 19A:
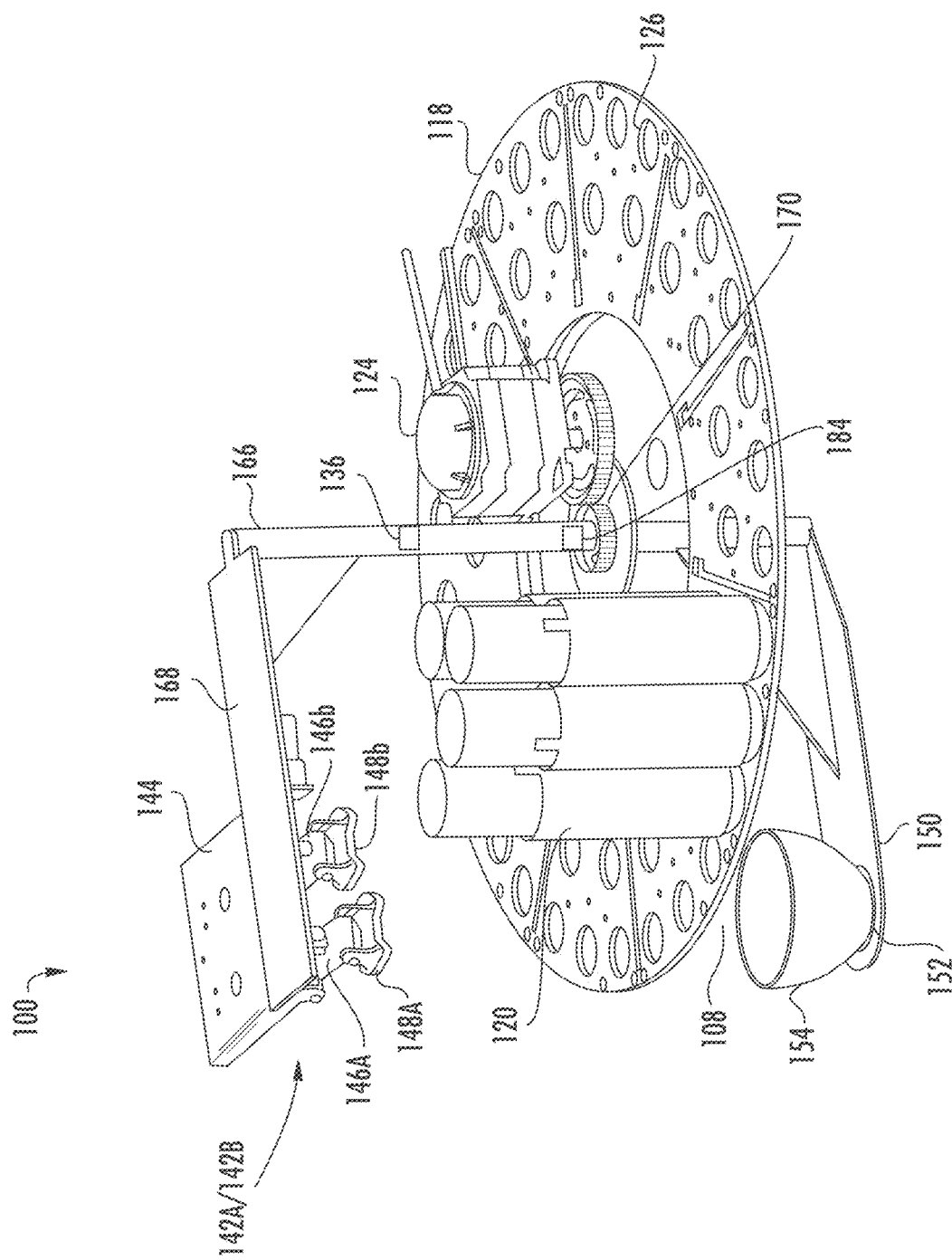
FIG. 19A-19B illustrate perspective views of a portion of a dye dispensing apparatus in accordance with some embodiments.
Figure 19B:
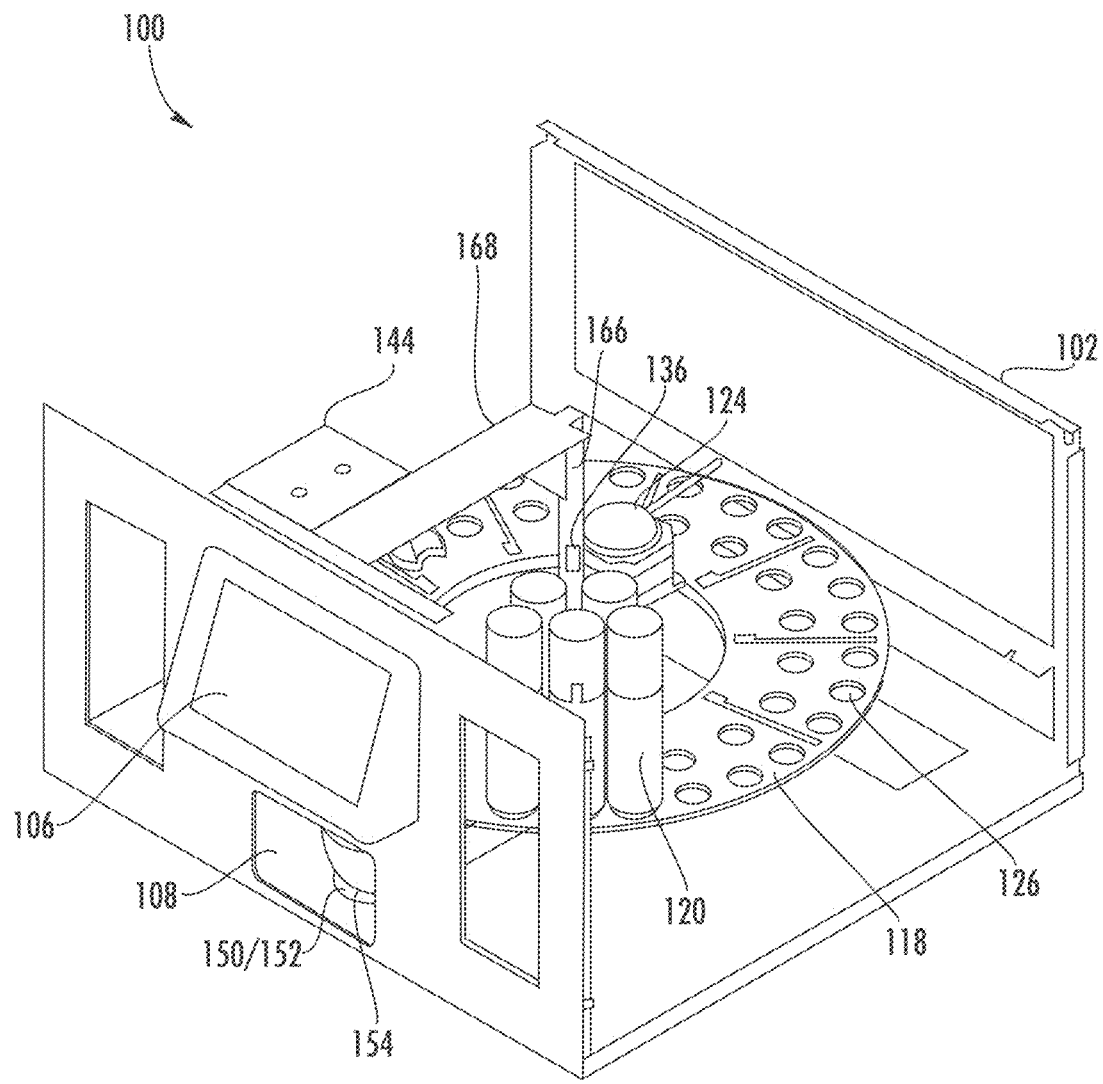

FIGS. 19A and 19B illustrate perspective views of a portion of the dye dispensing apparatus 100 in accordance with some embodiments. In this configuration, a shaft 166 has an extension 168. The shaft 166 may be coupled to the tray 118 such at the center of the tray 118. The dispenser 142 is coupled to the extension, and the plate 150 with the instrument 152 is coupled to the shaft 166. The instrument 152 may be a strain gauge. The receptacle 154 is coupled to the plate 150 in the dispensing area 108. The aligning of the selected canister 120 with the dispensing area 108 is by the drive mechanism 124. The drive mechanism 124 is configured to rotate the shaft 166 thus also rotating the extension 168, dispenser 142 and plate 150, while the tray 118 is stationary. The drive mechanism 124 may be a motor coupled to gears, and a bearing 170 may be coupled to the shaft 166 or tray 118 to enable the rotation of the shaft 166.

For example, the reader 136 may be coupled to the shaft 166, the extension 168 or the plate 150. In this way, when the shaft 166 is rotated by the drive mechanism 124, the reader 136 can identify the selected canister 120. Once the selected canister 120 is identified, the selected canister 120 is aligned with the dispensing area 108. The dispenser 142 may be a dual dispenser 142a, 142b as shown in FIG. 9B. As described previously, the controller 116 communicates with the drive mechanism 124 to align the selected canister 120 with the dispensing area 108. The controller 116 also communicates with the actuator 144 which activates and positions the lever arm 146a, 146b with the projection 148a, 148b directly above the selected canister 120. The dispenser 142a, 142b applies a downward force on the selected canister 120 while the projection 148a, 148b is in direct contact with top surface of the canister 120. This opens the valve 130 of the canister 120 and causes dye 134 to escape through the nozzle 132 of the canister 120. This may be collected in the receptacle 154. This may be repeated until all of the contents of the dye formulation have been dispensed. The nozzle 132 on the canister 120 may be cleaned of residue by a brush coupled to the shaft 166. As the shaft 166 rotates, the brush contacts the nozzle 132 removing residue.

Figure 20A:
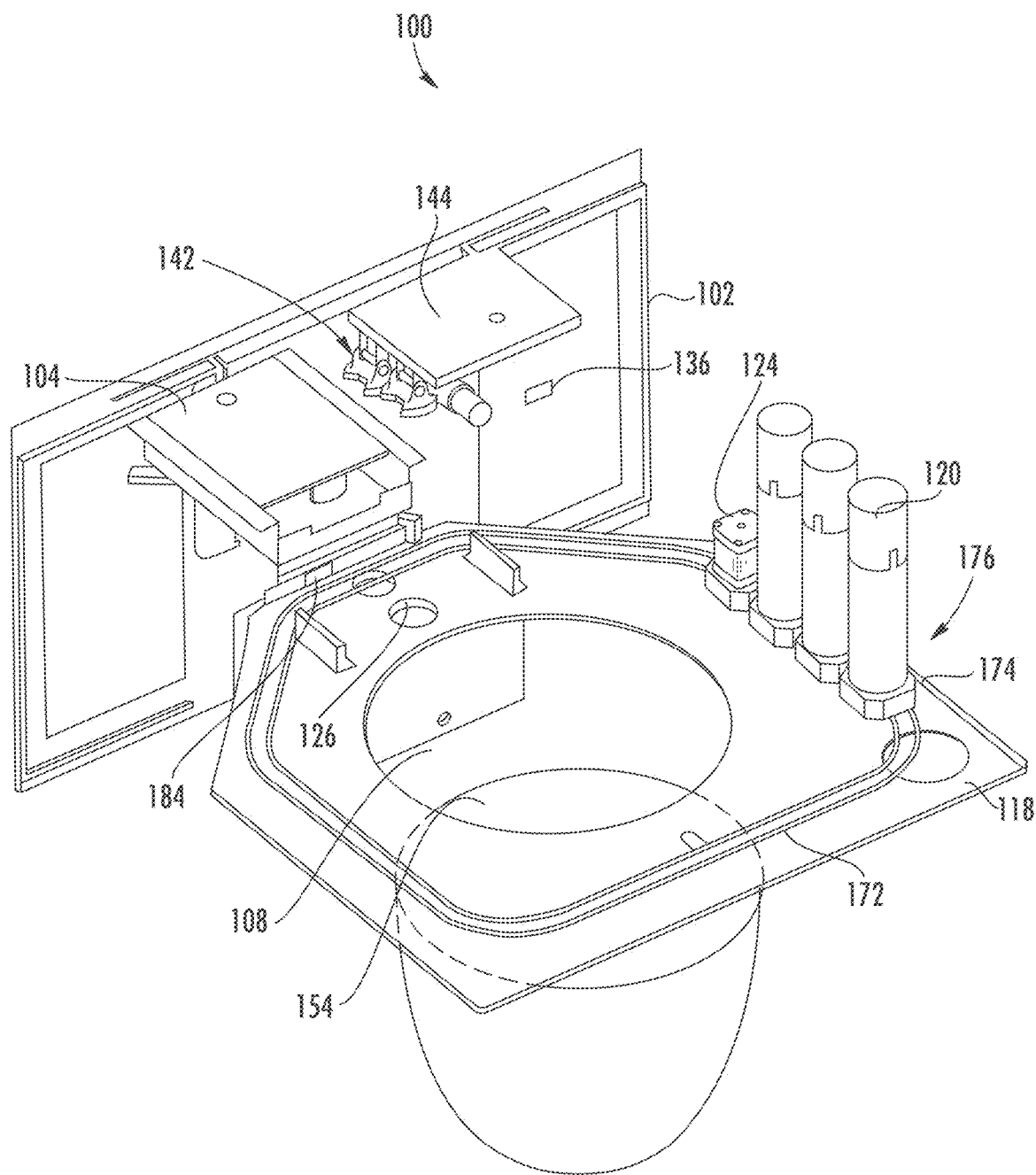
FIG. 20A illustrates a perspective view of a portion of a dye dispensing apparatus in accordance with some embodiments.

FIG. 20A illustrates a perspective view of a portion of the dye dispensing apparatus 100 in yet another configuration for moving the canisters. In this embodiment, a track 172 is coupled to the tray 118 and has at least one cart 174. There may be one or more carts 174 forming a train 176. The track 172 may have a two-rail configuration or other suitable configurations. The cart 174 is configured to hold at least one canister 120. The drive mechanism 124 may be placed in a cart 174 and configured to translate the cart 174 or train 176 riding on the track 172 by a motor. The dispenser 142 may be a single design such as shown in FIG. 8B or a dual design such as shown in FIG. 9A or 9B. The tray 118 is configured with at least one opening 126. This may serve as the dispensing area 108 with the plate 150 and receptacle 154 configured directly below opening 126.

The dispenser 142 may be coupled to the housing 102. The aligning of the selected canister 120 with the dispensing area 108 is by the drive mechanism 124 through the controller 116. For example, the reader 136 may be coupled to the housing 102, the tray 118 or the dispenser 142. In this way, when the cart 174 or train 176 is translated along the track 172 by the drive mechanism 124, the reader 136 can identify the selected canister 120. Once the selected canister 120 is identified, the selected canister 120 via the cart 174 on the track 172 is translated until it is aligned with the dispensing area 108. The dispenser 142 then contacts the selected canister 120 with the projection 148 and dispenses the selected dye 134. This may be repeated until all of the contents of the dye formulation have been dispensed. The nozzle 132 on the canister 120 may be cleaned of residue by a brush coupled to the underside of the tray 118. As the cart 174 translates along the track 172, the brush contacts the nozzle 132 removing residue.

In other embodiments, the dispenser 142 of FIG. 20A may instead be coupled to the mounting bracket 143 (as shown in FIG. 8B) and operate as described in FIG. 8B with reference to the dispenser 142. Alternatively, the dispenser 142 may be coupled to the shaft 166 as shown in FIGS. 19A and 19B and operate in the same manner as described.

Figure 20B:
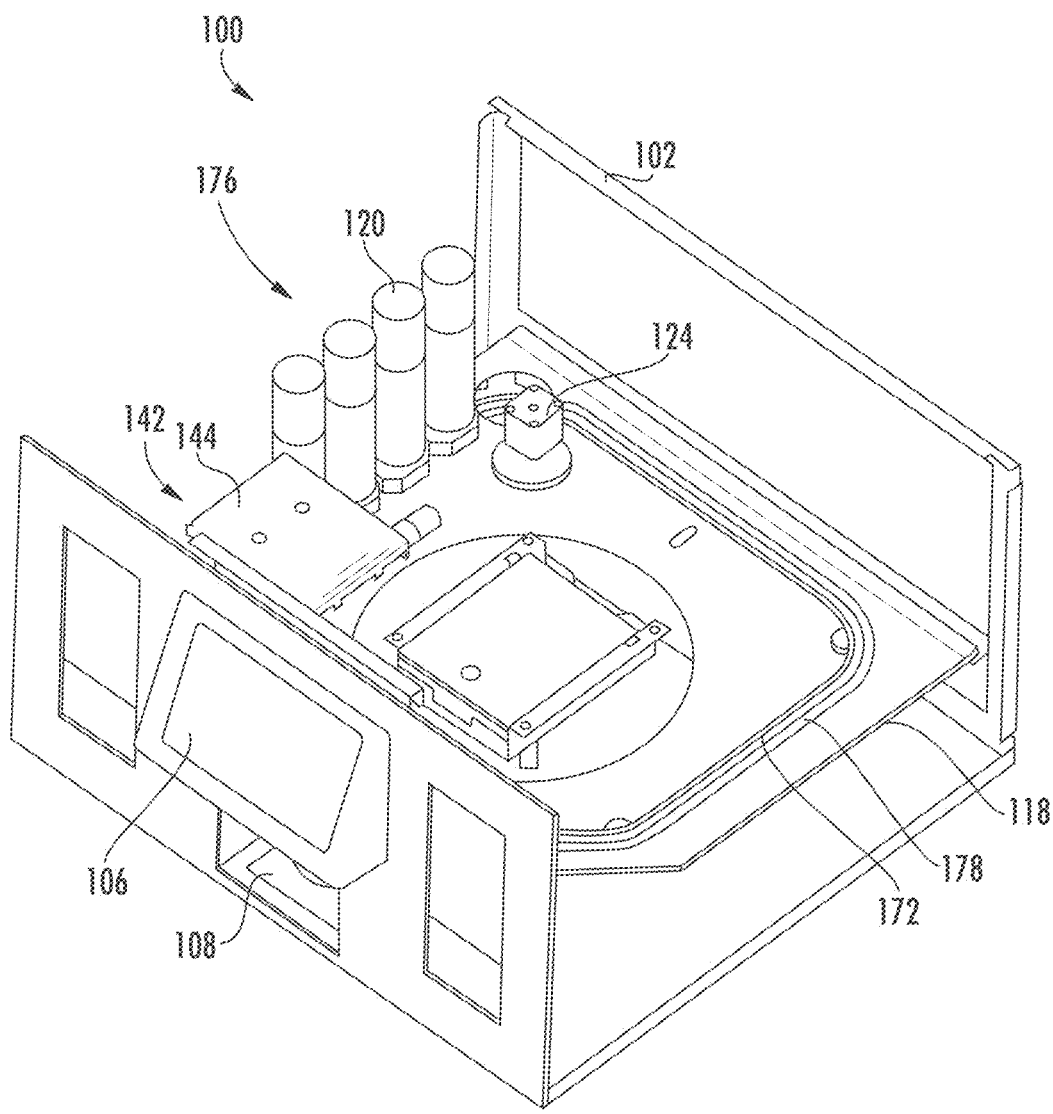
FIG. 20B illustrates a perspective view of a portion of a dye dispensing apparatus in accordance with some embodiments.

FIG. 20B illustrates a perspective view of a portion of the dye dispensing apparatus 100 in yet another configuration, similar to FIG. 20A. In this embodiment, the track 172 may have a two-rail configuration with the drive mechanism 124 which includes a motor, chain 178 and pulley system. The chain 178 is located between the two-rail track 172 and coupled to the cart 174. The cart 174 or train 176 is translated along the track 172 by the chain 178 driven system. The motor of the drive mechanism 124 may be located on the tray 118 or another suitable location.

In some embodiments, the apparatus 100 includes an optical sensor 184 to detect the position and/or presence of the at least one canister 120. The sensor 184 may be coupled to the apparatus 100 at, for example, the shaft 166 (refer to FIG. 19A), the tray 118, the housing 102 (refer to FIG. 20A), or any location with a direct view of the canisters 120, and be in communication with the reader 136 via the controller 116. In this way, as the canister 120 and sensor 184 pass one another, the sensor 184 detects the presence and position of the canister 120 creating a map for which openings 126 have canisters 120. Then, communicating with the controller 116 and/or reader 136, the reader 136 then identifies the canister 120 via the identifier 128.

Figure 21A:
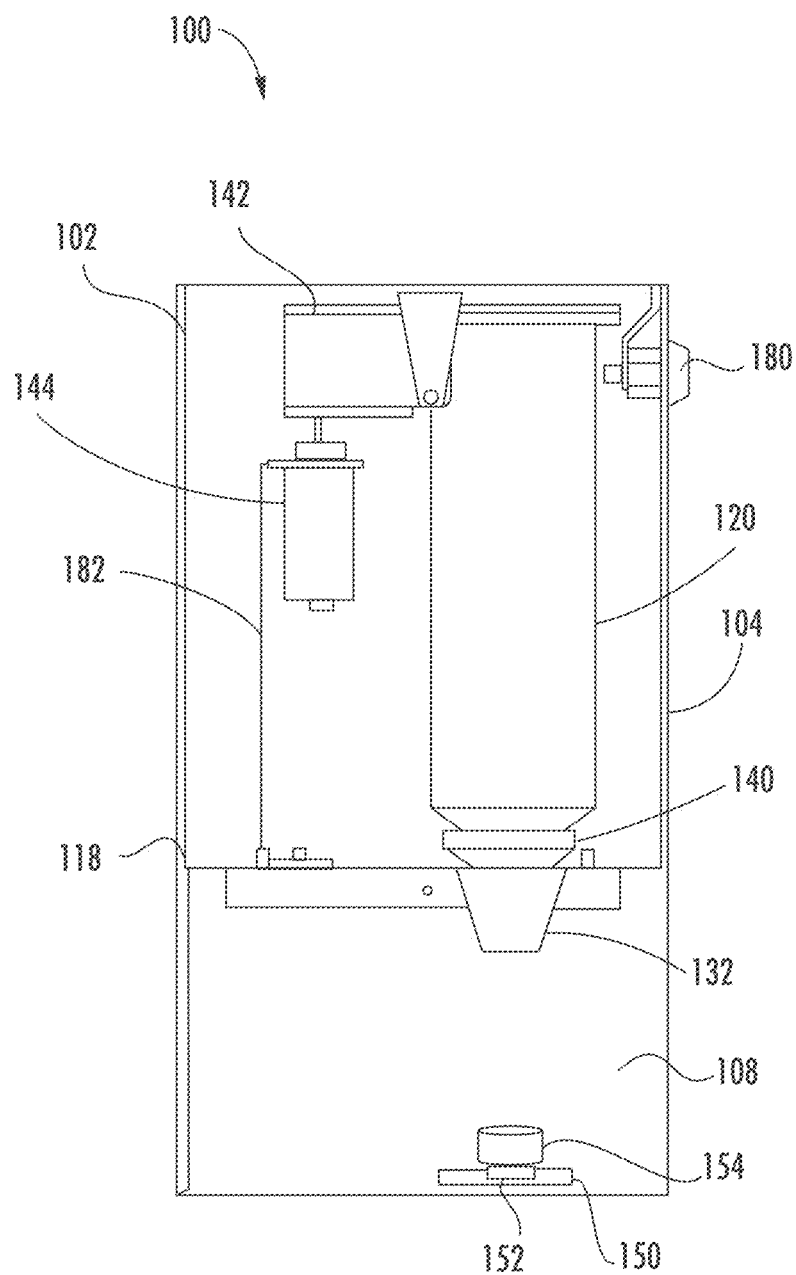
FIG. 21A illustrates a side interior view of a portion of a dye dispensing apparatus in accordance with some embodiments.

FIG. 21A illustrates a side interior view of a portion of the dye dispensing apparatus 100 in an embodiment in which the apparatus 100 is configured with only one canister 120. The canister 120 may be loaded via the door 104 which may be located on the side of the housing 102 or on top of the housing 102. A lock 180 for the door 104 may be provided for security. The canister is coupled to the nozzle 132 and fits into the coupler 140 in the opening 126 of the tray 118. The actuator 144, for example, a solenoid, is mounted to the tray 118 or the housing 102 by a strut 182. The dispenser 142 depresses the canister 120 to dispense the dye 134 within the canister 120 into the dispensing area 108 and into the receptacle 154 on the plate 150 with the instrument 152.

Figure 21B:
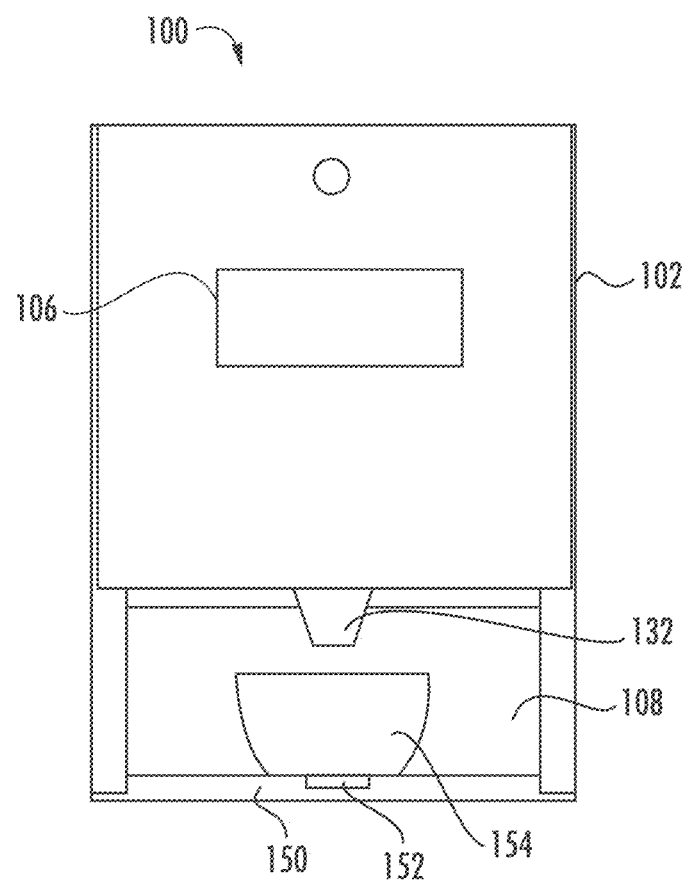
FIG. 21B is a front view of the dye dispensing apparatus in FIG. 21A in accordance with some embodiments.

FIG. 21B is a front view of the dye dispensing apparatus 100 in FIG. 21A in accordance with some embodiments. The apparatus may be operated by the panel 106 or by the mobile device 112. In one embodiment, a plurality of apparatuses 100 are mounted together, each having one canister 120, communicating and controlled by the controller 116. The dye formulation is comprised of different dyes 134, for example, F1, F2, F3 to F(x) and may be communicated to the user on the panel 106 or by the mobile device 112. After F1 is dispensed, the receptacle 154 may be moved to the next apparatus 100 where F2 is dispensed. After F2 is dispensed, the receptacle 154 may be moved to the next apparatus 100 where F3 is dispensed, and so on, until the dye formulation is complete. Alternatively, there may be only one apparatus 100 and the selected canister 120 may be loaded after each dye 134 is dispensed until the dye formulation is complete. The user may be directed via the user interface to accomplish the loading and unloading of the canisters 120 and/or moving the receptacle 154 to collect the dispensed dye 134.

The dye dispensing system or method is a comprehensive solution providing precision repeatability for custom dye formulas, packaging innovation, aid for the open stock inventory, and reordering capabilities. In some embodiments, virtually all of the dye within the canister is utilized. The salon industry generally struggles with waste during color services, inventory management expense and carrying costs, customer retention issues associated with the quality of hair color formulations and high customer acquisition costs. For hair dye, the industry generally relies on a small container such as a tube filled with dye. When performing a color service on a client, the stylist mixes the color hair by using a portion of the dye from the tube and multiple tubes are typically required. This stresses the environment with excessive packaging and waste because leftover hair color and packaging are distributed into water systems and landfills. Additionally, the unused portion of the dye in the container often goes to waste because it may not be needed for another client or is ruined due to oxygen exposure. By utilizing the canisters as opposed to the typical tubes of dye, tube, dye waste and packaging are eliminated. The typical tube of dye is approximately 1.7 ounces to 3.2 ounces. By using the canisters which in one embodiment, is configured to contain 8.6 ounces, many tubes are replaced with one recyclable, refillable and reusable canister.

The dye dispensing system 110 may be configured to track inventory and generate reports. For example, the identifier 128 of each canister 120 may be read during installation, and thereby the dye dispensing system 110 may monitor, track and reorder inventory. A self-diagnostic scan may be performed by the controller 116 or reader 136, or a combination of the two, to monitor the current operation status, location errors, warnings or failures.

The dye dispensing system 110 may automate the reordering process of the canisters 120 and salon payment processes. For example, an inventory management system may initiate replacement orders. The orders may be with an exclusive vendor that provides automatic shipping thus saving the salon owner inventory carrying costs and management labor. The inventory may be vetted against shipping data to track the information from order to delivery. The canisters 120 with the dyes 134 may be automatically invoiced and purchased electronically and automatically thus minimizing the payment effort and streamlining the processing of accounts receivable of the salon. In some embodiments, the method has a tiered marketing strategy offering direct sales to top tier salons and manufacturer representatives for lower tiers. In other embodiments, factory direct shipping of the canister reduces shipping costs and outer packaging.

Conventionally, the stylist hand-mixes the dye combinations of hair colors that are manually dispensed from tubes, containers or bottles. The industry relies on rudimentary hand-mixing tools. A poorly mixed hair color formula may result in hot spots on the scalp and inconsistent color results on the hair. In one embodiment, a cap for the receptacle 154 is provided. The cap is configured with an opening which the dispensed dye 134 may flow through when the cap is coupled to the receptacle. The cap may also be configured with a whisk driven by a motor. When the cap is coupled to the receptacle 154, the dispensed dye 134 in the receptacle 154 may be mixed by the whisk to the correct consistency, thereby mixing all of the dye 134 evenly so as not to leave any unmixed color on the surface of the receptacle 154. The whisk may be configured to be disconnected from the motor by, for example, a push and turn mechanism operating counterclockwise to the rotation of the whisk. The material of the receptacle and whisk may minimize friction and aid in cleaning hydrophobic materials. The whisk may removable and cleaned after each use.

In another embodiment, the dye dispensing system 110 is configured with a 360° image capturing capability, designed to produce an image of the client's head and shoulders. An associated application would provide an avatar of the hair and face along with a pallet of dye colors to try on, allowing the client to visualize how they would look with various colors of hair. Once selected, the target color may be translated into a formula for distribution by the dye dispensing system 110. In a further embodiment, an optical scanner may capture a three-dimensional image of the client that may be used to calculate the volume of dye required to color the hair and transmit the information to the dye dispensing system 110.

In yet another embodiment, the dye dispensing system is configured with a sensor to provide hair color feedback. Digital profiles of the client's hair before and after the hair color applications may be evaluated to access the quality of the dye formula in relation to the target color selected by the client. The hair of each client has differing characteristics that impacts the results of the hair color treatment. The feedback loop may provide data for optimizing the formula towards the target color with each use based on algorithms to translate the differences between the target and actual color into formulations that are optimized and customized per client. As data is gathered from clients, the system may be capable of learning formula adjustments thereby accurately creating formulas that achieve the target color with a smaller number of applications. This capability may also improve "first time" applications which are a common source of anxiety for stylists and clients.

In further embodiments, the apparatus 100 and method 1100 can dispense other liquids such as, for example, developer, shampoo, conditioner, additives, lotion, moisturizer, nail polish, tanning solutions, paint or any combination thereof.

In the descriptions above and in the claims, phrases such as "at least one" or "one or more" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

While the specification has been described in detail with respect to specific embodiments of the present invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A hair dye dispensing system that dispenses hair dye for a client in a plurality of unique hair color formulations, the system comprising:
   a dispenser, configured to dispense hair dye formulations into a receptacle;
   a radio-frequency identification (RFID) sensor configured to read an RFID tag connected to the receptacle; a display;
   a controller configured to:
   identify an RFID tag connected to the receptacle based on information received from the RFID sensor; associate the RFID tag connected to the receptacle with information stored in a memory of the hair dye dispensing system, the information including client hair data information; and dispense hair dye into the receptacle based on the client hair data information associated with the RFID tag connected to the receptacle,
   a measuring instrument configured to measure an amount of the hair dye formulation remaining in the receptacle after a portion of the dispensed hair dye formulation is used and associate the amount of hair dye formulation remaining within the receptacle with the RFID tag connected to the receptacle, and
   wherein the controller is further configured to associate the client hair data information with the measured amount of the hair dye formulation remaining in the receptacle.

2. The system of claim 1, wherein the client hair data information comprises at least one of hair stylist information, client information, one or more attributes of a client's hair, one or more details of the hair dye formulation, a type of application for the hair dye formulation, a location on a client's head for the hair dye formulation, and a desired amount of the hair dye formulation.

3. The system of claim 1, wherein the controller is further configured to store the association between the RFID tag connected to the receptacle and the client hair data information in the memory.

4. The system of claim 1, wherein the receptacle is at least one of recyclable, refillable, and reusable.

5. The system of claim 1, wherein the client hair data information stored in a memory of the hair dye dispensing system includes stylist information.

6. The system of claim 1, wherein the client hair data information stored in a memory of the hair dye dispensing system includes client information.

7. The system of claim 1, wherein the dispenser is further configured to dispense hair developer formulations into the receptacle.

8. The system of claim 1, wherein the display comprises a touch screen for entering the client hair data.

9. The system of claim 1, wherein the system communicates with a mobile phone for entering the information into the system.

10. The system of claim 9, wherein the information entered into the system comprises client information of a client, attributes of hair of the client, a formulation, a type of application for the formulation, a location on a head of the client for the formulation, or a first desired amount of the formulation to be dispensed.

11. A method of dispensing hair dye in a plurality of unique hair color formulations, the method comprising:
   dispensing hair dye formulations into a receptacle;
   identifying a radio-frequency identification (RFID) tag connected to the receptacle based on information received from an RFID sensor;
   associating the RFID tag connected to the receptacle with client hair data information stored in a memory of the hair dye dispensing system;

dispensing hair dye into the receptacle based on the client hair data information associated with the RFID tag connected to the receptacle;

measuring an amount of the hair dye formulation remaining in the receptacle after a portion of the dispensed hair dye formulation is used and associating the amount of hair dye formulation remaining within the receptacle with the RFID tag connected to the receptacle, and associating the client hair data information with the measured amount of the hair dye formulation remaining in the receptacle.

12. The method of claim 11, wherein the client hair data information comprises at least one of hair stylist information, client information, one or more attributes of a client's hair, one or more details of the hair dye formulation, a type of application for the hair dye formulation, a location on a client's head for the hair dye formulation, and a desired amount of the hair dye formulation.

13. The method of claim 11, further comprising storing the association between the RFID tag connected to the receptacle and the client hair data information in the memory.

14. The method of claim 11, wherein the receptacle is at least one of recyclable, refillable, and reusable.

15. The method of claim 11, further comprising dispensing hair developer into the receptacle.

16. The method of claim 11, further comprising entering the client hair data into a touch screen prior to the dispensing of the hair dye.

17. A dye dispensing system that dispenses hair dye in a plurality of unique hair color formulations, the system comprising:

means for dispensing hair dye formulations into a receptacle;

means for identifying a radio-frequency identification (RFID) tag connected to the receptacle based on information received from an RFID sensor;

means for associating the RFID tag connected to the receptacle with client hair data information stored in a memory of the hair dye dispensing system;

means for dispensing hair dye into the receptacle based on the client hair data information associated with the RFID tag connected to the receptacle; and means for measuring an amount of the hair dye formulation remaining in the receptacle after a portion of the dispensed hair dye formulation is used and associating the amount of hair dye formulation remaining within the receptacle with the RFID tag connected to the receptacle, and means for associating the client hair data information with the measured amount of the hair dye formulation remaining in the receptacle.

18. The system of claim 17, wherein the means for dispensing is further configured for dispensing hair developer into the receptacle.

19. The system of claim 17, wherein the system comprises a touch screen for entering the client hair data into the system.

* * * * *